US012769064B2

(12) United States Patent
Gregorski et al.

(10) Patent No.: US 12,769,064 B2
(45) Date of Patent: Oct. 20, 2026

(54) PRECISION TRANSFERRED FIBER ARRAY UNIT

(71) Applicant: CORNING RESEARCH & DEVELOPMENT CORPORATION, Corning, NY (US)

(72) Inventors: Steven Joseph Gregorski, Painted Post, NY (US); Qi Wu, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 309 days.

(21) Appl. No.: 18/387,595

(22) Filed: Nov. 7, 2023

(65) Prior Publication Data

US 2025/0147240 A1 May 8, 2025

(51) Int. Cl.
*G02B 6/36* (2006.01)
*B29D 11/00* (2006.01)

(52) U.S. Cl.
CPC ...... *G02B 6/3672* (2013.01); *B29D 11/00663* (2013.01)

(58) Field of Classification Search
CPC ...... G02B 6/3664-3676; G02B 6/3672; G02B 6/3696; B29D 11/00663
See application file for complete search history.

(56) References Cited

U.S. PATENT DOCUMENTS 5,199,966 A 4/1993 Harvey et al.
7,027,707 B2 * 4/2006 Imaki .................. G02B 6/3636 428/167
7,373,053 B2 * 5/2008 Takahashi .............. G02B 6/368 385/16
9,709,750 B1 7/2017 Kuang et al.
10,107,967 B1 10/2018 Butler et al.
10,422,961 B2 9/2019 Logunov et al.
(Continued)

FOREIGN PATENT DOCUMENTS

EP 0737876 A2 * 10/1996 ............... G02B 6/30
JP 10-020141 A 1/1998

OTHER PUBLICATIONS

Basavanhally et al., "Fiber arrays for large optical cross-connect switches; a design and reliability study," The 17th Annual Meeting of the IEEE Lasers and Electro-Optics Society, 2004. vol. 2, LEOS 2004., Rio Grande, PR, USA, 2004, pp. 659-660.
(Continued)

*Primary Examiner* — Rhonda S Peace
(74) *Attorney, Agent, or Firm* — Adam R. Weeks

(57) ABSTRACT

A fiber array unit, and a method and apparatus for fabricating the fiber array unit. The fiber array unit includes optical fibers that define a two-dimensional array of fiber end faces, and are encapsulated by a matrix that holds the optical fibers in place. The fiber array unit is fabricated by seating optical fibers in grooves of an arcuate surface, and applying an amount of uncured matrix thereto. A substrate is moved into contact with the matrix and the matrix cured to bond the optical fibers to each other and the substrate. The substrate is moved away from the arcuate surface to release the bonded optical fibers. The process can be repeated to fabricate a fiber array unit having multiple rows of optical fibers.

15 Claims, 15 Drawing Sheets

(56) References Cited

U.S. PATENT DOCUMENTS

| | | | | |
|---|---|---|---|---|
| 11,415,754 | B2 | 8/2022 | Butler et al. | |
| 2004/0105650 | A1* | 6/2004 | Imaki | G02B 6/3636 385/137 |
| 2004/0165854 | A1* | 8/2004 | Niiyama | G02B 6/3652 385/137 |
| 2017/0063005 | A1* | 3/2017 | Wang | G02B 6/3684 |
| 2022/0026604 | A1 | 1/2022 | Clark et al. | |
| 2024/0142709 | A1* | 5/2024 | Chen | G02B 6/30 |
| 2025/0147240 | A1* | 5/2025 | Gregorski | G02B 6/3652 |

OTHER PUBLICATIONS

Chen et al., "Manufacture of a 2D optical fiber array coupler with micrometer precision for laser radar applications", 2015 J. Micromech. Microeng. 25 015015, 7 pages.

Kumagai et al., "Optical Fiber Array with 90-degree Bend for Silicon Photonics Chip Coupling", SEI Technical Review • No. 89 • Oct. 2019, 5 pages.

Schroder et al., "Array fiber welding on micro optical glass substrates for chip-to-fiber coupling", Proc. SPIE 8991, Optical Interconnects XIV, 89910F (Mar. 8, 2014), 10 pages.

* cited by examiner

PRECISION TRANSFERRED FIBER ARRAY UNIT

TECHNICAL FIELD

This disclosure relates generally to optical connectivity, and more particularly to an apparatus and method for terminating optical fibers.

BACKGROUND

Integrated photonic circuits have widespread applications including high speed optical transceivers for hyperscale datacenters, sensors, quantum computing, and photonic accelerators. Integrated photonic circuits may be based on any of several different types of semiconductor technology. Commonly used platforms include indium phosphide (InP) and silicon photonics (SiPh). Integrated photonic devices use different types of optical waveguides (e.g., planar glass or silicon nitride) to transport optical signals depending on the underlying semiconductor technology.

One of the challenges in the deployment of integrated photonic circuits is providing fiber-to-chip connections that couple optical signals between the integrated photonic circuits and the optical fibers which connect the circuits through an optical network. FIGS. 1 and 2 depict side and end cross-sectional views (respectively) of an exemplary fiber optic cable 10. The fiber optic cable 10 includes an optical fiber 12 and a protective coating 14 (e.g., a buffer layer and/or outer jacket) that surrounds and protects the optical fiber 12. The protective coating 14 prevents the optical fiber 12 from being damaged by normal handling, such as when the fiber optic cable 10 is pulled through a conduit or otherwise manipulated during installation in a fiber optic network. The optical fiber 12 includes a core 16 and a cladding 18 that surrounds the core 16. The core 16 and cladding 18 are typically made of fused silica that is doped to have different indexes of refraction. The optical fiber 12 thus provides an optical waveguide that generally confines optical signals propagating through the fiber optic cable 10 to a region of the optical fiber 12 in and around the core 16.

One type of device used to couple optical signals between waveguides and optical fibers 12 is known as a fiber array unit. Conventional fiber array units include a substrate having v-grooves into which each optical fiber 12 must be precisely positioned. The v-grooves are typically spaced to match the pitch of the waveguide cores, and must have sub-micron precision to avoid excessive signal loss. The required precision is typically provided by forming the v-grooves in a glass or silicon substrate. Producing a fiber array unit using a v-groove substrate involves complex assembly and polishing processes. These processes make it difficult to automate fabrication of fiber array units for high volume applications, such as photonic transceivers and sensors.

Another challenge with fiber array units is that it is difficult to scale the arrays to support multirow or "two-dimensional" arrays. Applications such as wavelength selective switches, micro-electro-mechanical system (MEMS) optical cross connect switches, and light detection and ranging (LiDAR) are a few of the technologies that can benefit from the high optical signal densities possible with two-dimensional fiber array units.

One method of fabricating two-dimensional fiber array units involves stacking multiple one-dimensional fiber array units. However, stacking requires precisely aligning multiple v-groove substrates, which makes the assembly process exceedingly complex. The use of multiple one-dimensional arrays also significantly reduces the maximum optical fiber density as compared to that achievable based solely on optical fiber dimensions. The above difficulties, as well as problems with tolerance stack up in the vertical dimension, have set a practical limit on the number of one-dimensional fiber array units that can be stacked.

Another method of fabricating two-dimensional fiber array units involves the use of a micro hole array face plate to position the optical fibers. This technology was first developed for three-dimensional MEMS micro mirror array based optical cross connect switches. Methods of fabricating precision micro hole array face plates include deep reactive ion etching of silicon, ultrafast laser drilling, laser assisted chemical etching of glass, and ultraviolet lithographic, galvanoformung, abformung (LIGA). However, regardless of how the micro hole array face plate is fabricated, assembling the two-dimensional fiber array unit is time consuming due to the difficulty in feeding individual optical fibers through each of the micro holes.

Alternative two-dimensional fiber array units have been attempted that avoid the used of v-grooves or micro hole arrays based on the high geometric precision of optical fiber cladding. However, because these fiber array units require the fibers to be closely packed, the core pitch is limited to the fiber cladding diameter or a multiple thereof. Furthermore, core pitch error accumulates over large array sizes, thereby placing a practical limit on size.

Yet another approach to making one dimensional fiber arrays or two-dimensional collimator arrays involves laser welding or bonding optical fibers to a glass substrate. Although these methods actively align the fiber position, the process is serial in nature and thus has limited throughput. Moreover, this method cannot be used to fabricate a two-dimensional fiber array unit.

Known fiber array units include at least one precision substrate component to support the position of each fiber. However, the need for this precision substrate component and the accompanying complex assembly process hinder automation for volume production. Thus, there is a need in the fiber optic industry for improved fiber array units, as well as apparatuses and methods of fabricating these improved fiber array units.

SUMMARY

In an aspect of the disclosure, a fiber array unit is disclosed. The fiber array unit includes a unit end face, a plurality of optical fibers each including a fiber end face, and a matrix. The optical fibers are configured so that the fiber end faces define a two-dimensional array of fiber end faces in the unit end face, and the matrix encapsulates least a portion of each of the plurality of optical fibers and holds the fiber end faces in place in the unit end face.

In an embodiment of the disclosed fiber array unit, each optical fiber may have an entry point into the matrix, and follow a curved path between the entry point and the unit end face.

In another embodiment of the disclosed fiber array unit, each of the optical fibers may have an orientation at the entry point into the matrix, and the curved path may be configured so that the unit end face is angled relative to the orientation.

In another embodiment of the disclosed fiber array unit, the fiber array unit may further include a substrate having a fiber-side surface onto which the matrix is deposited.

In another embodiment of the disclosed fiber array unit, each of the plurality of optical fibers may be tangential to the fiber-side surface of the substrate at the unit end face.

In another embodiment of the disclosed fiber array unit, the fiber-side surface of the substrate may not include any fiber alignment features.

In another embodiment of the disclosed fiber array unit, the substrate may include a plurality of projections that project outwardly from the fiber-side surface, and the plurality of projections may be configured to fill a portion of the matrix between fiber end faces adjacent to the fiber-side surface and to avoid contact with any of the plurality of optical fibers.

In another embodiment of the disclosed fiber array unit, the fiber end faces of the two-dimensional array of fiber end faces may be arranged into a plurality of rows. In this embodiment, the fiber array unit may further include one or more spacers each embedded in the matrix between adjacent rows of the fiber end faces, and the one or more spacers may be configured to fill at least a portion of the matrix between adjacent rows of optical fibers.

In another embodiment of the disclosed fiber array unit, each spacer may include a plurality of projections that project outwardly from the spacer, and the plurality of projections may be configured to fill a portion of the matrix between adjacent fiber end faces in a row of fiber end faces, and to avoid contact with any of the plurality of optical fibers.

In another aspect of the disclosure, a method of fabricating the fiber array unit is disclosed. The method includes seating each of a plurality of first optical fibers in a respective groove of an arcuate surface having a plurality of grooves, and applying a first amount of uncured matrix sufficient to cover at least a portion of each of the plurality of first optical fibers seated in the grooves of the arcuate surface. The method further includes moving the substrate having the fiber-side surface to a first bonding distance from the arcuate surface that brings the fiber-side surface into contact with the first amount of uncured matrix, and curing the first amount of uncured matrix so that the first optical fibers are bonded to the substrate by a first amount of cured matrix. The method further moves the substrate to a separation distance from the arcuate surface so that the plurality of first optical fibers bonded to the substrate are released from the arcuate surface.

In an embodiment of the method, the method may further include seating each of a plurality of second optical fibers in the respective groove of the arcuate surface having the plurality of grooves, applying a second amount of uncured matrix sufficient to cover at least a portion of each of the plurality of second optical fibers seated in the grooves of the arcuate surface, moving the substrate to a second bonding distance from the arcuate surface that brings the plurality of first optical fibers into contact with the second amount of uncured matrix, and curing the second amount of uncured matrix so that the plurality of second optical fibers are bonded to the substrate by the first amount of cured matrix and a second amount of cured matrix.

In another embodiment of the method, the second bonding distance may place the fiber-side surface of the substrate farther from the arcuate surface than the first bonding distance by a first predetermined distance corresponding to a vertical pitch of the fiber array unit, and the plurality of grooves may be spaced by a second predetermined distance corresponding to a horizontal pitch of the fiber array unit.

In another embodiment of the method, curing the first amount of uncured matrix may include exposing the first amount of uncured matrix to ultraviolet light.

In another embodiment of the method, seating each of the plurality of first optical fibers in the respective groove of the arcuate surface may include applying tension to the plurality of first optical fibers.

In another embodiment of the method, the method may further include determining the substrate has reached the first bonding distance from the arcuate surface based on an increase in an amount of resistance to the movement of the substrate.

In another aspect of the disclosure, an apparatus for fabricating the fiber array unit is disclosed. The apparatus includes the arcuate surface having the plurality of grooves configured to receive the plurality of first optical fibers, a holder configured to receive the substrate having the fiber-side surface, and a linear stage configured to selectively move the holder towards and away from the arcuate surface.

In an embodiment of the apparatus, the apparatus may further include a controller in communication with the linear stage and having one or more processors and a memory storing program code. When executed by the one or more processors, the program code may cause the apparatus to move the substrate to the first bonding distance from the arcuate surface that brings the fiber-side surface into contact with the first amount of uncured matrix applied to the plurality of first optical fibers seated in the grooves of the arcuate surface.

The program code may further cause the apparatus to cure the first amount of uncured matrix so that the optical fibers are bonded to the substrate by the first amount of cured matrix, and move the substrate to the separation distance from the arcuate surface so that the plurality of first optical fibers bonded to the substrate are released from the arcuate surface.

In another embodiment of the apparatus, the program code may further cause the apparatus to move the substrate to the second bonding distance from the arcuate surface that brings the plurality of first optical fibers into contact with the second amount of uncured matrix applied to the plurality of second optical fibers seated in the grooves of the arcuate surface, and cure the second amount of uncured matrix so that the second optical fibers are bonded to the substrate by the first amount of cured matrix and the second amount of cured matrix.

In another embodiment of the apparatus, the second bonding distance may place the fiber-side surface of the substrate farther from the arcuate surface than the first bonding distance by the first predetermined distance corresponding to the vertical pitch of the fiber array unit, and the plurality of grooves may be spaced by the second predetermined distance corresponding to the horizontal pitch of the fiber array unit.

In another embodiment of the apparatus, the apparatus may include an ultraviolet curing light in communication with the controller, and the program code may cause the apparatus to cure the first amount of uncured matrix by activating the ultraviolet curing light and exposing the first amount of uncured matrix to ultraviolet light.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. The present disclosure describes a novel two-dimensional fiber array unit that overcomes the limitations of current fiber array unit technology described above. The use of a substrate having precision alignment features is avoided by using a layer-by-layer precision replication process and precisely transferring the one-dimensional fiber arrays to define a two-dimensional fiber array. The resulting fiber array unit avoids the need for a precision v-groove glass substrate, two-dimensional precision hole array plate, or other precision alignment devices. Rather, the fiber array units use a simple low precision substrate, which reduces component cost. The fabrication process may be used to fabricate any fiber array unit configuration, and is low cost, scalable, and automatable.

Figure 1:
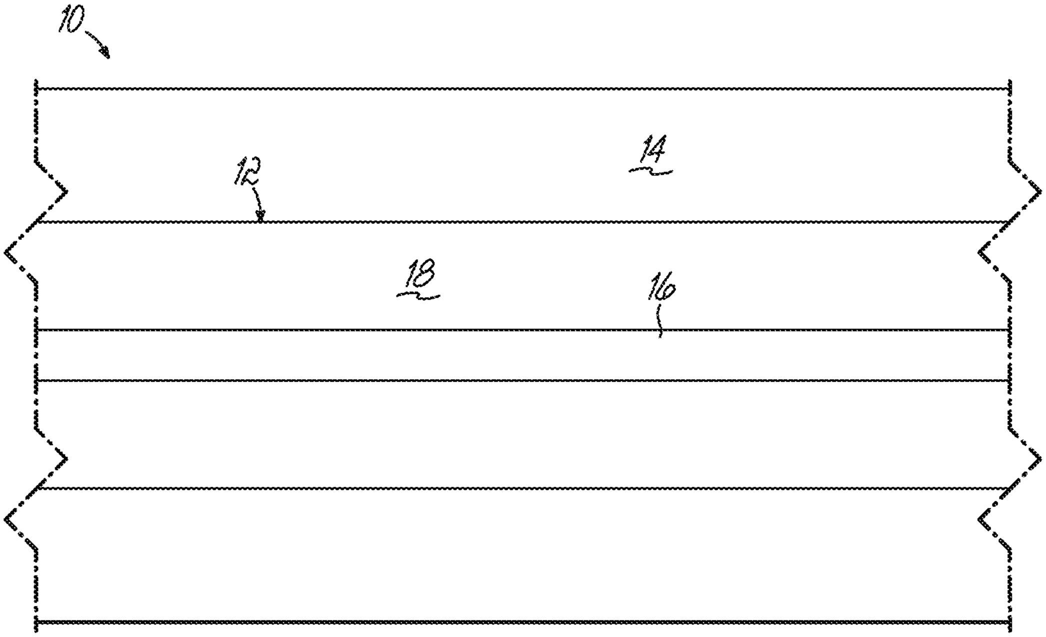
FIG. 1 PRIOR ART
FIG. 1 is a lengthwise cross-sectional view of an optical fiber.
Figure 2:
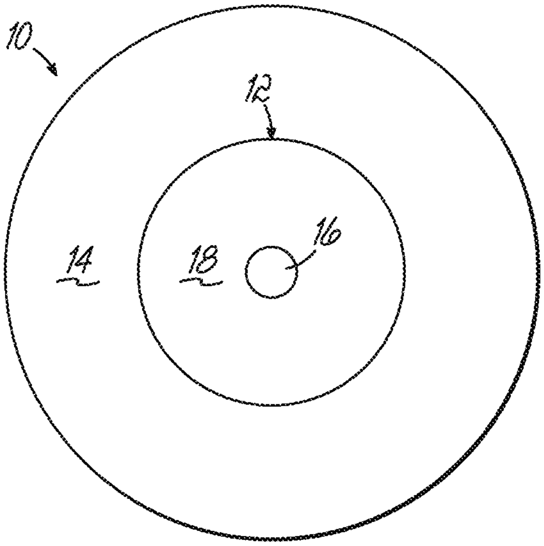
FIG. 2 PRIOR ART
FIG. 2 is an endwise cross-sectional view of the optical fiber of FIG. 1.
Figure 3:
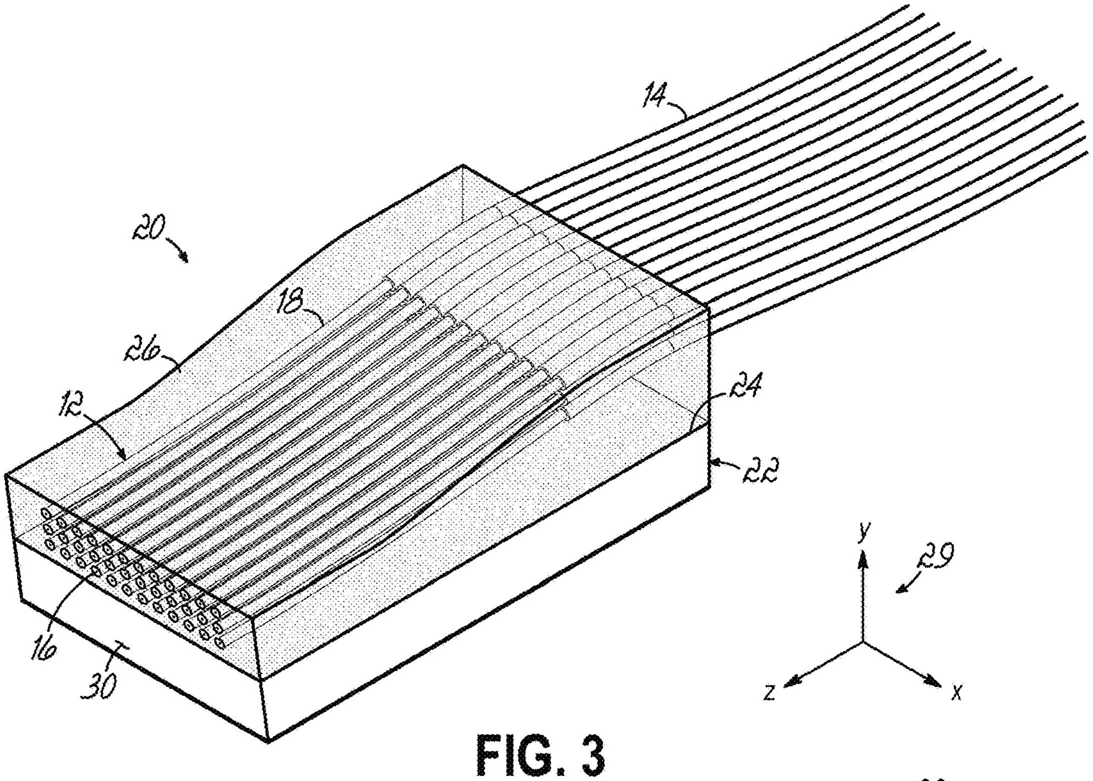
FIG. 3 is a perspective view of an exemplary fiber array unit.
Figure 4:
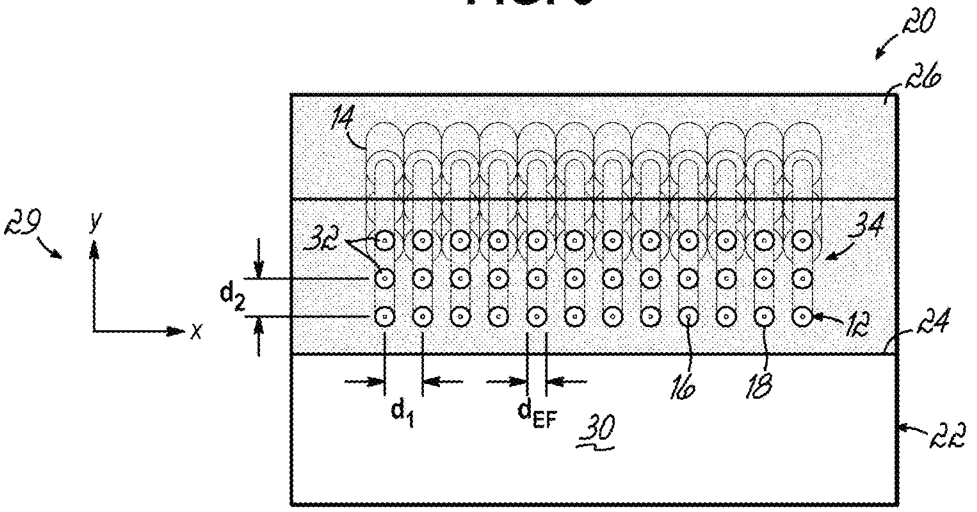
FIG. 4 is an end view of the fiber array unit of FIG. 3.
Figure 5:
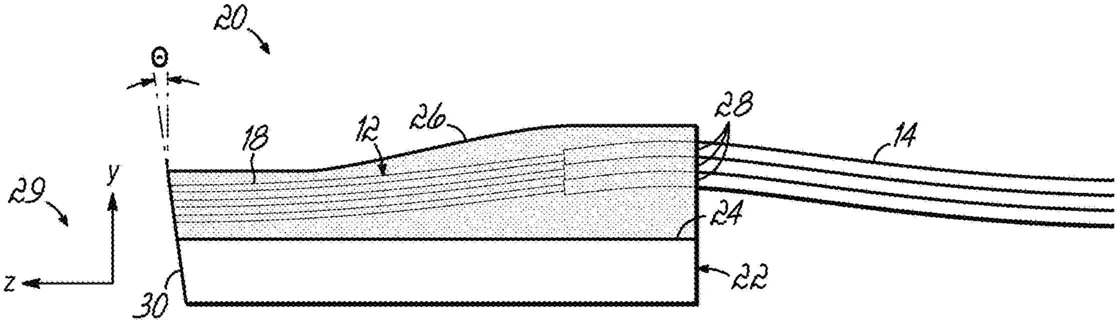
FIG. 5 is a side view of the fiber array unit of FIGS. 4 and 5.

FIGS. 3-5 illustrate a perspective view, an end view, and a side view, respectfully, of an exemplary fiber array unit 20. The fiber array unit 20 includes a plurality of optical fibers 12, a substrate 22 having a fiber-side surface 24, and a matrix 26 (e.g., an ultraviolet (UV) cured adhesive) that holds each optical fiber 12 in a predefined position. The optical fibers 12 may be single mode or multimode. Each optical fiber 12 may be configured to have a length of exposed cladding 18 and a protective coating 14. The matrix 26 may be configured to encapsulate the exposed cladding 18 and a portion of the protective coating 14 of optical fiber 12, and hold each optical fiber 12 in a fixed position and orientation (i.e., a fixed "place") within the matrix 26. The fiber-side surface 24 of substrate 22 may be considered featureless in that the fiber-side surface does not include mechanical alignment features, such as v-grooves or through holes, that mechanically align the optical fibers 12.

A right-handed cartesian coordinate system 29 for use in describing placement of features in the fiber array unit 20 may be defined by a set of unit-length direction vectors intersecting at an origin. The direction vectors may include an x-axis generally parallel to the fiber-side surface 24 of substrate 22, a y-axis orthogonal to the x-axis and generally normal to the fiber-side surface 24 of substrate 22, and z-axis orthogonal to both the x and y-axes and generally parallel to the fiber-side surface 24 of substrate 22. In the depicted orientation, the x-axis may be considered as generally defining a "horizontal" axis of the fiber array unit 20, the y-axis may be considered as generally defining a "vertical" axis of the fiber array unit 20, and the z-axis may be considered as generally defining a "longitudinal" axis of the fiber array unit 20. In any case, it should be understood that the depicted coordinate system is exemplary only, and other coordinate systems may be used to describe the fiber array unit 20. It should also be understood that the location of the origin and orientation of the depicted coordinate system 29 is arbitrary, and may be varied for purposes of clarity when describing various depicted features.

As best shown by FIG. 4, a unit end face 30 of fiber array unit 20 includes a plurality of fiber end faces 32 arranged in a two-dimensional array 34, e.g., a 3×12 array. The two-dimensional array 34 of fiber end faces 32 may have an x-pitch (e.g., horizontal pitch) $d_1$ and a y-pitch (e.g., vertical pitch) $d_2$. Each fiber end face 32 may have a diameter der. The x and y-pitches may be selected to align the core 16 of each optical fiber 12 with a respective waveguide of a photonic device (not shown) to which the fiber array unit 20 is to be operatively coupled. By way of example, each optical fiber 12 may be a single mode optical fiber 12 having a cladding diameter of 125 μm and a protective coating diameter (or "outer diameter") of 250 μm. In the above example, the two-dimensional array 34 may have x and y-pitches $d_1=d_2=250$ μm. It should be understood, however, that the optical fibers 12 may have other dimensions, and the x and y-pitches $d_1$, $d_2$, may be selected to provide any spacing necessary to interface with an integrated photonic circuit or other suitable device. The x and y-pitches $d_1$, $d_2$, may also be selected to be a multiple of the fiber end face diameter $d_{EF}$, e.g., $(1.10\times d_{EF})\leq d_1\leq(10.0\times d_{EF})$ and $(1.10\times d_{EF})\leq d_2\leq(10.0\times d_{EF})$.

As best shown by FIG. 5, at least a portion of optical fiber 12 may follow a curved path through the matrix 26 between the entry point 28 of the fiber into the matrix 26 and the unit end face 30 of fiber array unit 20. The unit end face 30 may be placed so that the optical fiber 12 is generally tangential to the fiber-side surface 24 of substrate 22 at the unit end face 30. The unit end face 30 of fiber array unit 20 may be polished, and may have a unit end face angle θ configured to provide a low return loss when the fiber array unit 20 is operatively coupled to an integrated photonic circuit.

The term "curved path" may be used to refer to a path that follows a curve (e.g., a plane curve) having a non-zero curvature. The unit end face 30 may be placed at a point on the curved path of the optical fiber 12 that is generally tangential to the fiber-side surface 24 of substrate 22. The tangent line of the curve at the terminal point of the curved path at the unit end face 30 may be generally parallel with the longitudinal axis of the fiber array unit 20. The curve may also lie in a plane generally perpendicular to the fiber-side surface 24 and the unit end face 30. This plane may be generally parallel to the vertical and longitudinal axes of the fiber array unit 20 and normal to the horizontal axis of the fiber array unit 20. The curve may have a positive curvature with respect to the longitudinal axis of the fiber array unit 20 such that the distance between the optical fiber 12 and fiber-side surface 24 of substrate 22 increases with increasing distance from the unit end face 30 along the longitudinal axis for at least a portion of the length of the optical fiber 12.

As used herein, the term "curvature" refers to the amount by which a curve deviates from being a straight line or, depending on the context, the amount a surface deviates from being a plane. The curvature at a point along a curve is equal the inverse of the radius of its osculating circle, which is the circle that best approximates the curve at the point. A curve that forms part of a circle (or a sphere) thus has a constant curvature equal to the reciprocal of its radius. A tangent line to the curve at a given point is a straight line that touches the curve at that point, which may be referred to as the point of tangency. The radius of the osculating circle for the point of tangency is colinear with a normal line to the curve intersecting the point of tangency. The normal line is orthogonal to the tangent line so that, in the case of a plane curve, the normal line and tangent line define the plane in which the curve lies.

The substrate 22 may be made from glass, ceramic, metal, composite materials, or any other suitable material. The matrix 26 may include an adhesive, resin, or other suitable material (e.g., a UV curable adhesive) with a low coefficient of thermal expansion, low shrinkage, and low moisture absorption. The matrix 26 may also include a filler comprising mechanically stable particles (e.g., glass particles) to improve the mechanical and/or optical properties (e.g., thermal stability) of the matrix 26.

Figure 6:
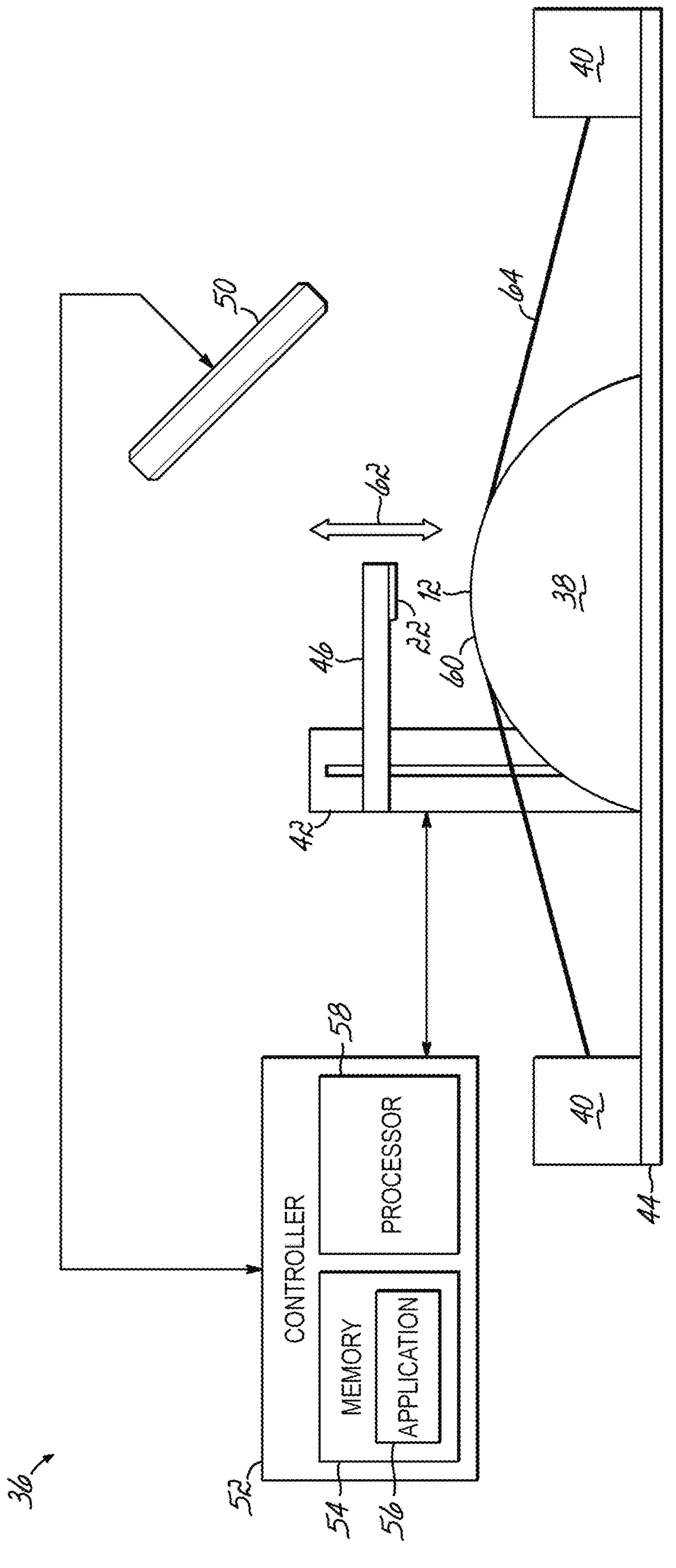
FIG. 6 is a schematic view of an exemplary apparatus that may be used to fabricate the fiber array unit of FIGS. 3-5 including a holder for holding a substrate and groove master having an arcuate surface.

FIG. 6 depicts an exemplary apparatus 36 that may be used to fabricate the fiber array unit 20. The apparatus 36 may include a groove master 38, one or more tensioning mechanisms 40, and linear stage 42 that are operatively coupled to a base 44. The apparatus 36 may further include a holder 46 configured to receive the substrate 22, a curing light 50 (e.g., a UV lamp), and a controller 52. The controller 52 may include a memory 54 storing program code in the form of an application 56, and a processor 58 in communication with the memory 54. The application 56 may be configured so that, when executed by the processor 58, the application causes the controller 52 to selectively activate the linear stage 42, curing light 50, and/or any other suitable components in accordance with a fabrication process.

The groove master 38 may include an arcuate surface 60 configured to engage a plurality of optical fibers 12. The plurality of optical fibers 12 may be provided by a fiber optic ribbon cable 64, for example, and may be held in tension against the arcuate surface 60 by the tensioning mechanisms 40. Accordingly, the arcuate surface 60 may have a spherical shape, an aspherical shape, or any other suitable curved shape having a non-zero curvature that provides this effect. Each tensioning mechanism 40 may include one or more clamps, elastic members, and/or other devices configured to apply tension to and/or maintain tension on the optical fibers 12. For embodiments in which the tensioning mechanisms 40 include active tension control, the amount of tension may be controlled by the controller 52.

The linear stage 42 may be configured to selectively move the holder 46 relative to the groove master 38 in a vertical or "y-direction" (as indicated by double-headed arrow 62) in response to signals from the controller 52. The linear stage 42 may also provide the controller 52 with information regarding the position of the holder 46 and/or the amount of force being applied to the holder 46.

Although depicted as being positioned external to the groove master 38 and holder 46, it should be understood that the curing light 50 may also be integrated into the groove master 38 and/or holder 46 so that light is provided to the matrix 26 through the arcuate surface 60 and/or substrate 22, and that one or more curing lights 50 may be provided in any of a plurality of suitable locations to ensure complete curing of the matrix 26. In an alternative embodiment of the invention, the curing light 50 may be replaced or supplemented by another curing mechanism, such as curing mechanism that provides a chemical, heat, or any other process suitable for curing the matrix 26.

Figure 7:
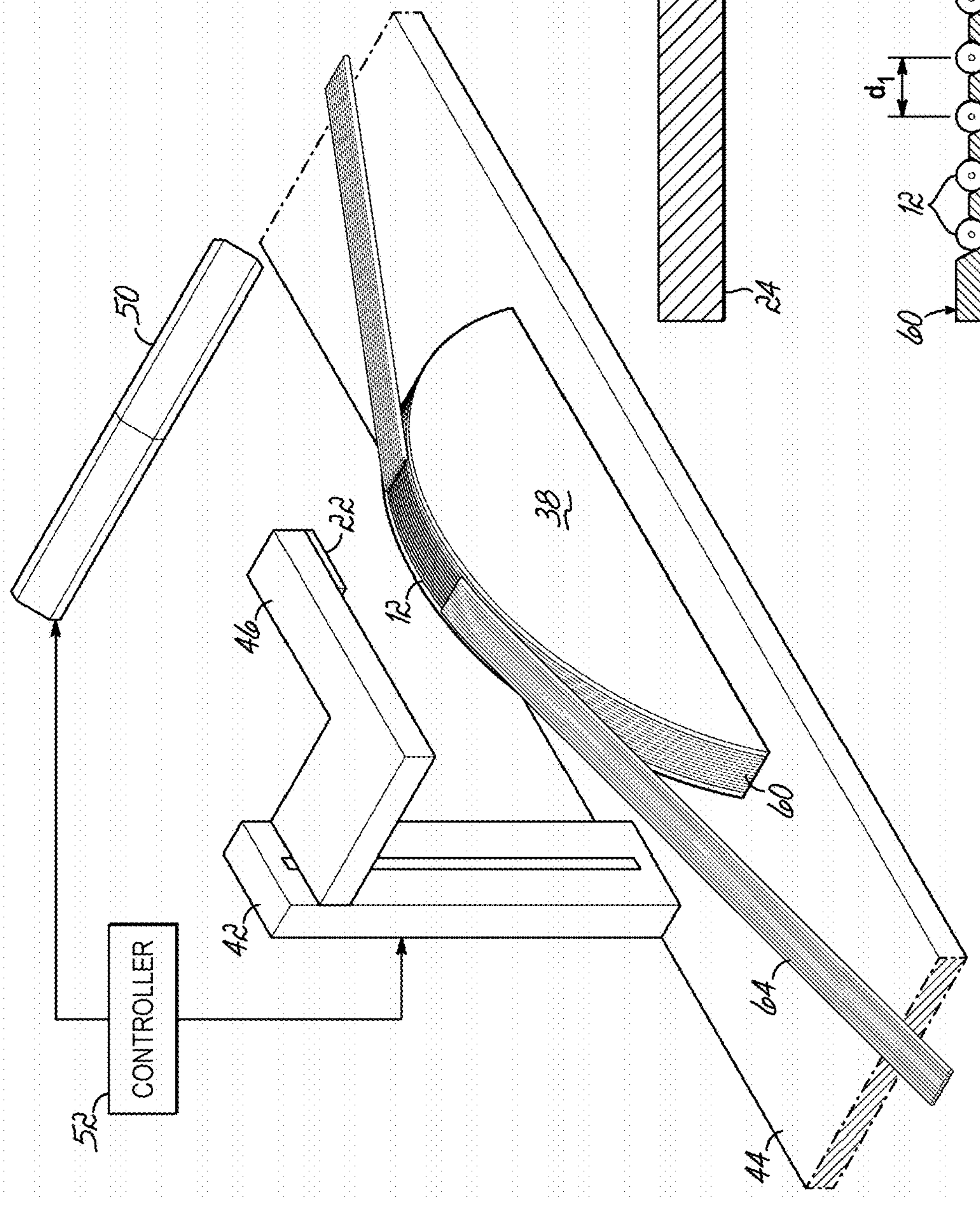
FIG. 7 is a schematic view of another exemplary apparatus for making fiber array units depicting the optical fibers of a fiber optic ribbon cable seated in grooves of the arcuate surface of FIG. 6.
Figure 8:
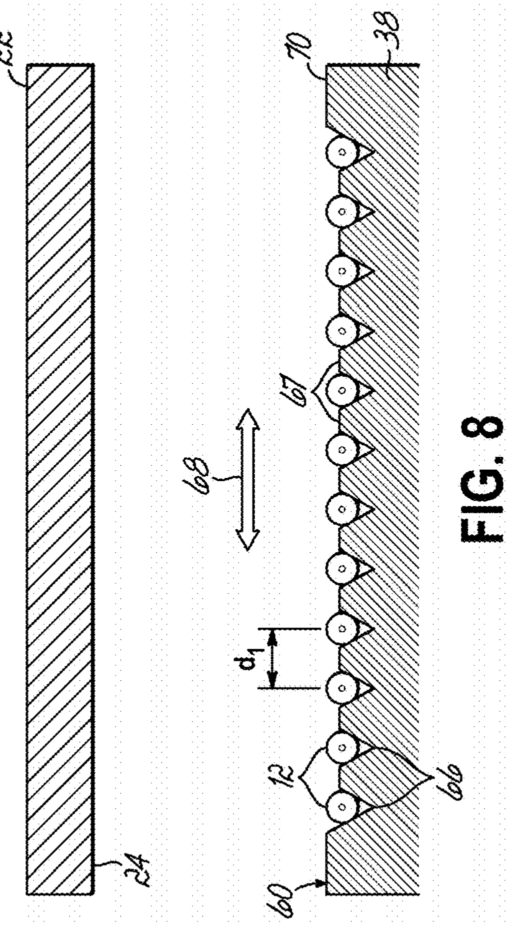
FIG. 8 is a cross-sectional view of the grooved arcuate surface and seated optical fibers of FIG. 7.

FIG. 7 depicts an exemplary embodiment of the apparatus 36 in which the plurality of optical fibers 12 are provided by a stripped portion of a fiber optic ribbon cable 64, and FIG. 8 depicts a cross-sectional view of the arcuate surface 60 of an exemplary groove master 38 of the apparatus of FIG. 7. The arcuate surface 60 includes a plurality of grooves 66 (e.g., 12 v-grooves) each configured to receive one of the plurality of optical fibers 12. The grooves 66 may be positioned across a width of the arcuate surface 60 so that a center line of each groove 66 is laterally separated in a horizontal or "x-direction" (as indicated by double-headed arrow 68) from one or more adjacent grooves 66 by a distance equal to the desired horizontal pitch $d_1$ of the two-dimensional array 34. Each groove 66 may also be configured to position each optical fiber 12 vertically so that the optical fibers 12 are arranged in a line, and so that a portion of each optical fiber 12 extends above a portion 67 of the arcuate surface 60 adjacent to each groove 66.

The substrate 22 may be bonded or otherwise temporarily coupled to the holder 46, e.g., using removable bonding agent. The arcuate surface 60 may include a dimensionally stable non-stick material, such as polyoxymethylene (commonly sold under the trade name Delrin®), a suitable metal coated with a non-stick substance (e.g., steel coated with a nonstick coating less than 100 nm thick), or any other suitable material or combination of materials. The grooves 66 may be defined in the arcuate surface 60, for example, by a precision diamond turning process, e.g., by turning a cylindrical member in a lath having an accuracy better than 100 nm.

Figure 9:
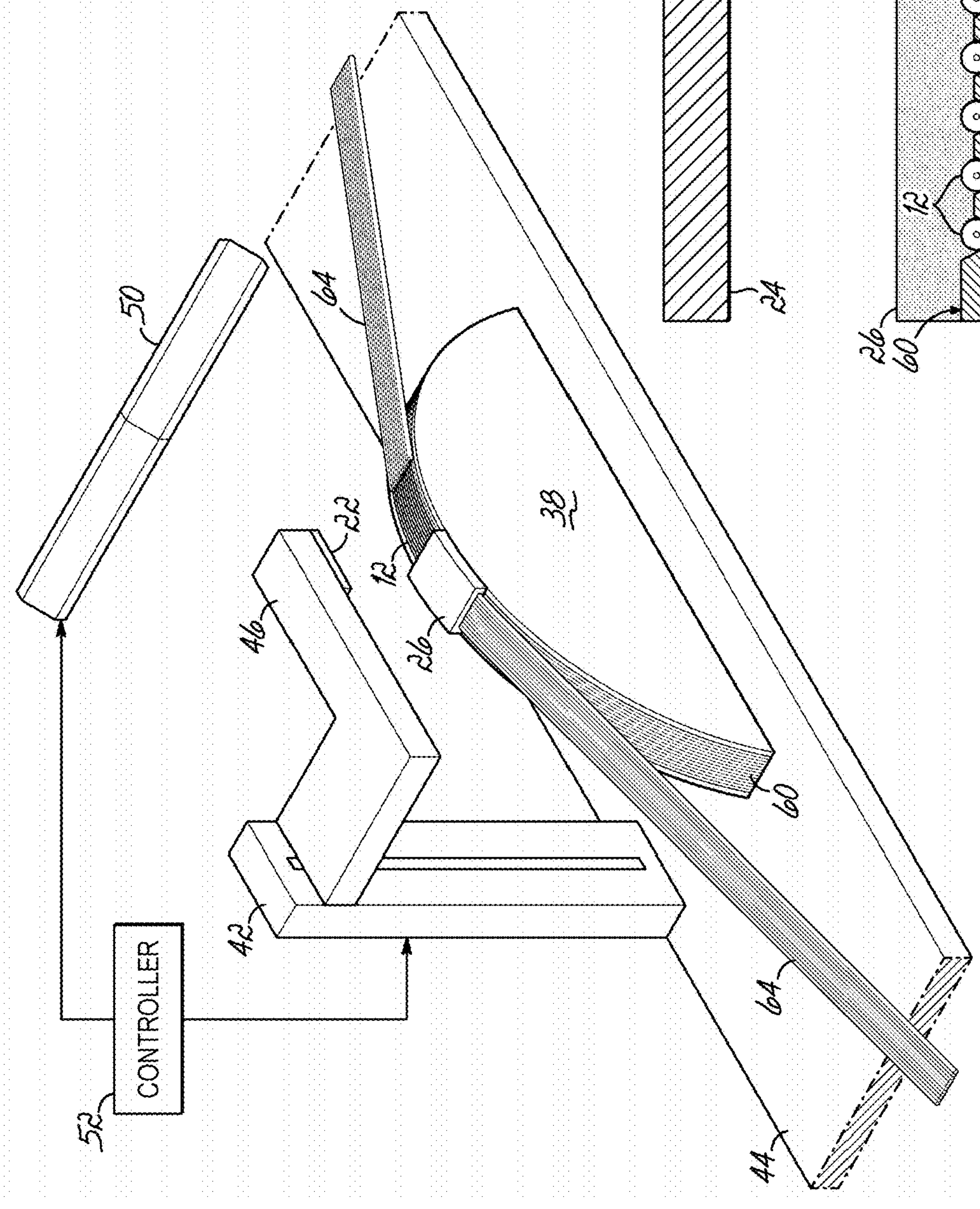
FIG. 9 is a schematic view of the apparatus of FIG. 7 depicting an amount of uncured matrix disposed on the optical fibers seated in the grooves.
Figure 10:
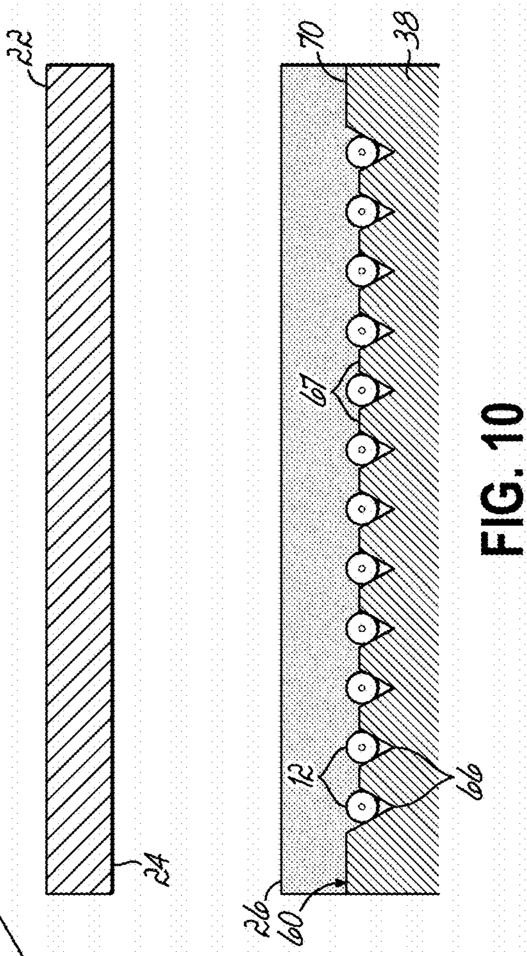
FIG. 10 is a cross-sectional view of the grooved arcuate surface, seated optical fibers, and uncured matrix of FIG. 9.

Referring now to FIGS. 9 and 10, the optical fibers 12 may be maintained under tension (e.g., by applying tension to the fiber optic ribbon cable 64) so that the optical fibers 12 are urged into contact with the surfaces of grooves 66 (i.e., are "seated" in the grooves 66) by the curve of arcuate surface 60. While the optical fibers 12 are seated in the grooves 66, a predetermined amount of the uncured matrix 26 may be applied to a portion of the optical fibers 12 on the groove master 38. The uncured matrix 26 may be sufficiently viscous to remain in place, or may be held in place by a mold, dam, or other suitable device (not shown).

Figure 11:
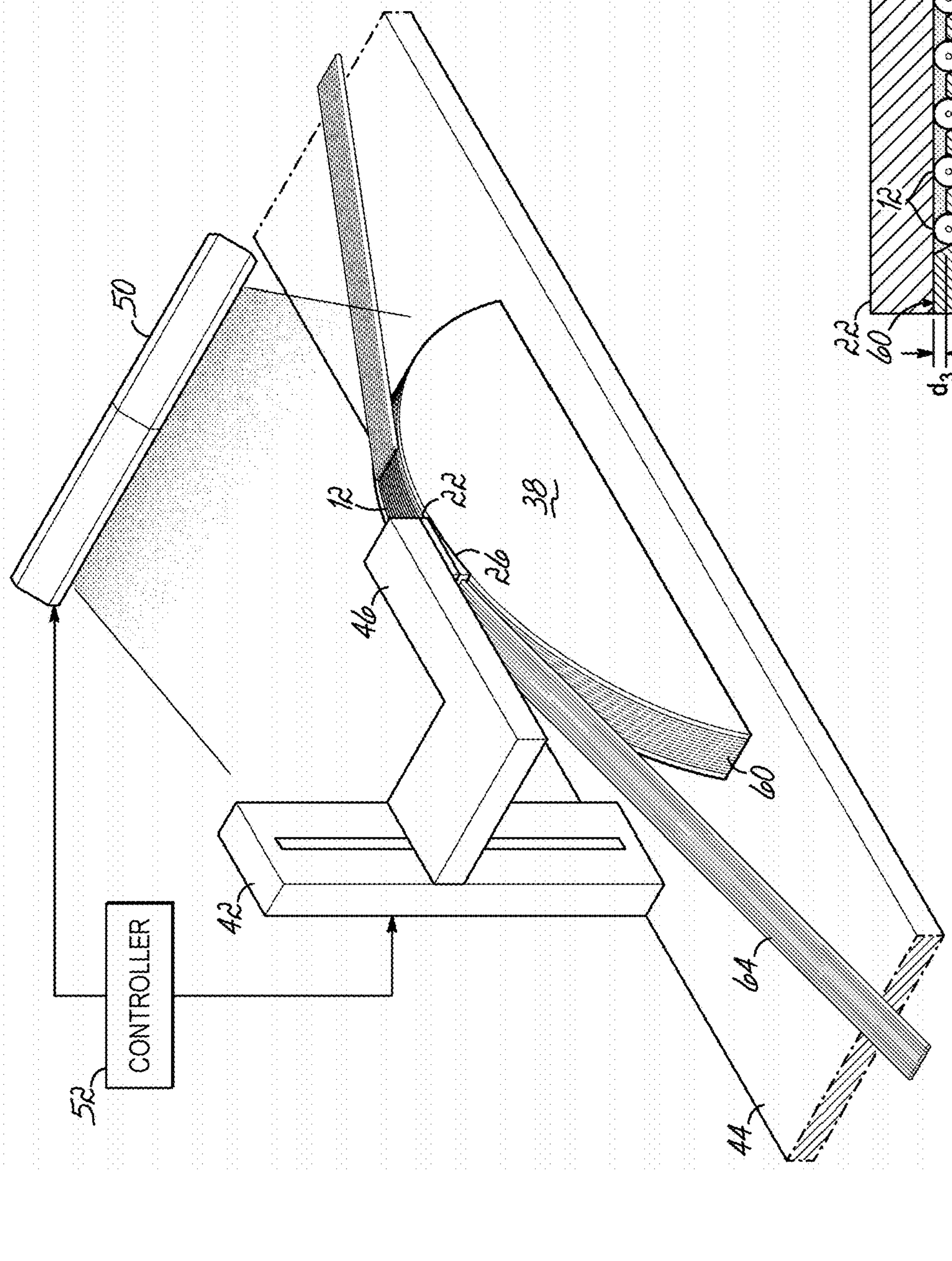
FIG. 11 is a schematic view of the apparatus of FIG. 9 depicting the holder in a bonding position that places the substrate in contact with the matrix.
Figure 12:
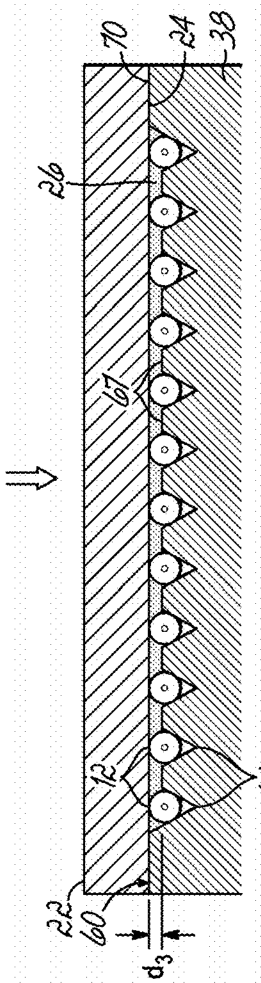
FIG. 12 is a cross-sectional view of the grooved arcuate surface, seated optical fibers, cured matrix, and substrate of FIG. 11.

As depicted by FIGS. 11 and 12, in response to the uncured matrix 26 being applied to the optical fibers 12, the substrate 22 may be moved (e.g., lowered) to a bonding distance that brings the fiber-side surface 24 of substrate 22 into contact with the uncured matrix 26. The bonding distance may be selected (e.g., preselected) so that the fiber-side surface 24 of substrate 22 is placed a predetermined distance $d_3$ from the portion 67 of arcuate surface 60 adjacent to the optical fibers 12. The predetermined distance $d_3$ may be selected so that the optical fibers 12 do not come into contact with, or are only lightly contacted by, the substrate 22. In an embodiment of the apparatus 36, the arcuate surface 60 may be configured so that the substrate 22 is at the bonding height when the fiber-side surface 24 thereof comes into contact with a stop 70. The stop 70 may be provided, for example, by a raised portion of the arcuate surface 60 proximate to the outermost grooves 66.

The controller 52 may determine that the substrate 22 has reached the bonding height, for example, based on an increase in the amount of resistance to movement of the substrate 22 indicative of the fiber-side surface 24 contacting the stop 70. The controller 52 may determine the amount of resistance to movement of the substrate 22 based on signals from the linear stage 42, a force sensor in the holder 46 (not shown), or any other suitable mechanism. In response to substrate 22 reaching the bonding height, the linear stage 42 may register its position $y_0$, e.g., by setting the output y of a linear encoder equal to zero or otherwise storing the position $y_0$ for future reference. While the substrate 22 is at the bonding height, the controller 52 may activate the curing light 50, thereby causing the uncured matrix 26 to harden into a cured matrix 26.

Figure 13:
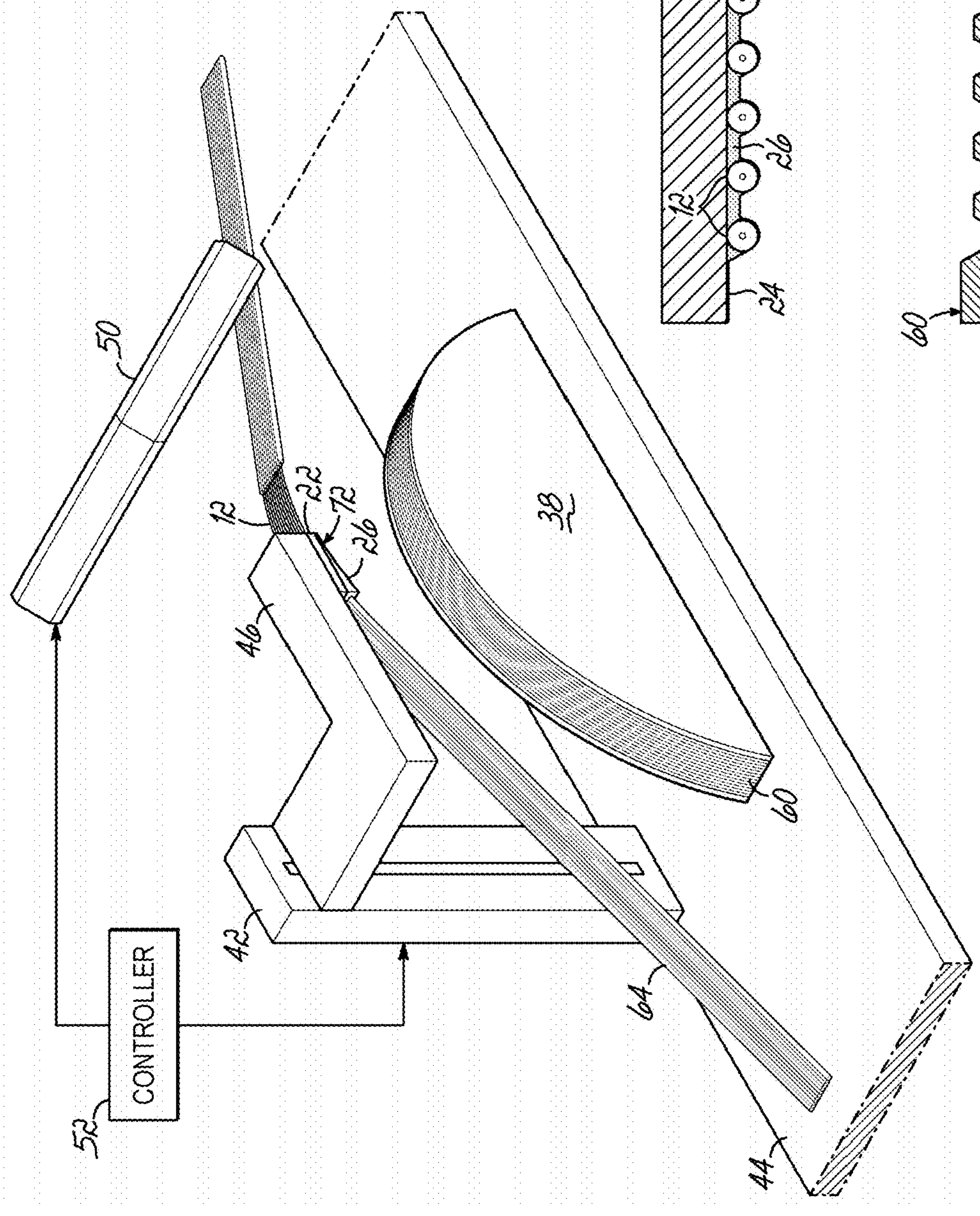
FIG. 13 is a schematic view of the apparatus of FIG. 11 depicting the holder in a separation position that releases the substrate and bonded optical fibers from the grooved arcuate surface.
Figure 14:
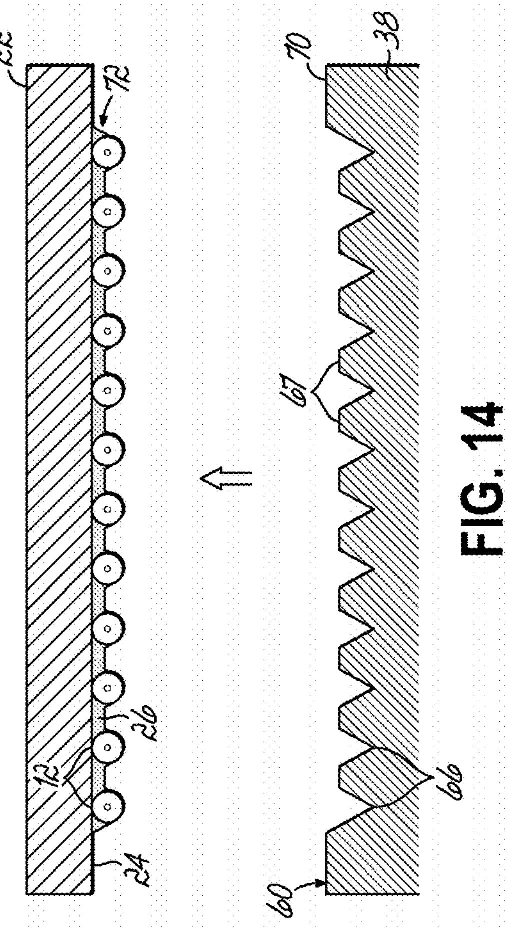
FIG. 14 is a cross-sectional view of the bonded optical fibers and substrate released from the grooved arcuate surface of FIG. 13.

Referring now to FIGS. 13 and 14, in response to the matrix 26 being cured by the curing light 50, the controller 52 may cause the linear stage 42 to move the holder 46 to a predetermined separation distance. Curing may be determined, for example, based on the amount of time the curing light 50 has been activated. The substrate 22, matrix 26, and the non-stick material of arcuate surface 60 may be selected so that the cured matrix 26 forms a stronger bond to the substrate 22 and optical fibers 12 than to the arcuate surface 60. Thus, as the linear stage 42 moves the substrate 22 away from the arcuate surface 60 of groove master 38, the optical fibers 12 and cured matrix 26 may be released from the arcuate surface 60. The released optical fibers 12 and cured matrix 26 may define a block 72 of bonded optical fibers 12 comprising (at this stage) a one-dimensional array, or "row", of optical fibers 12. The x-position of the core 16 of each optical fiber 12 in the block 72 of bonded optical fibers 12 may be defined by the dimensions of the groove master 38 and of the cladding 18 of optical fibers 12.

Figure 15:
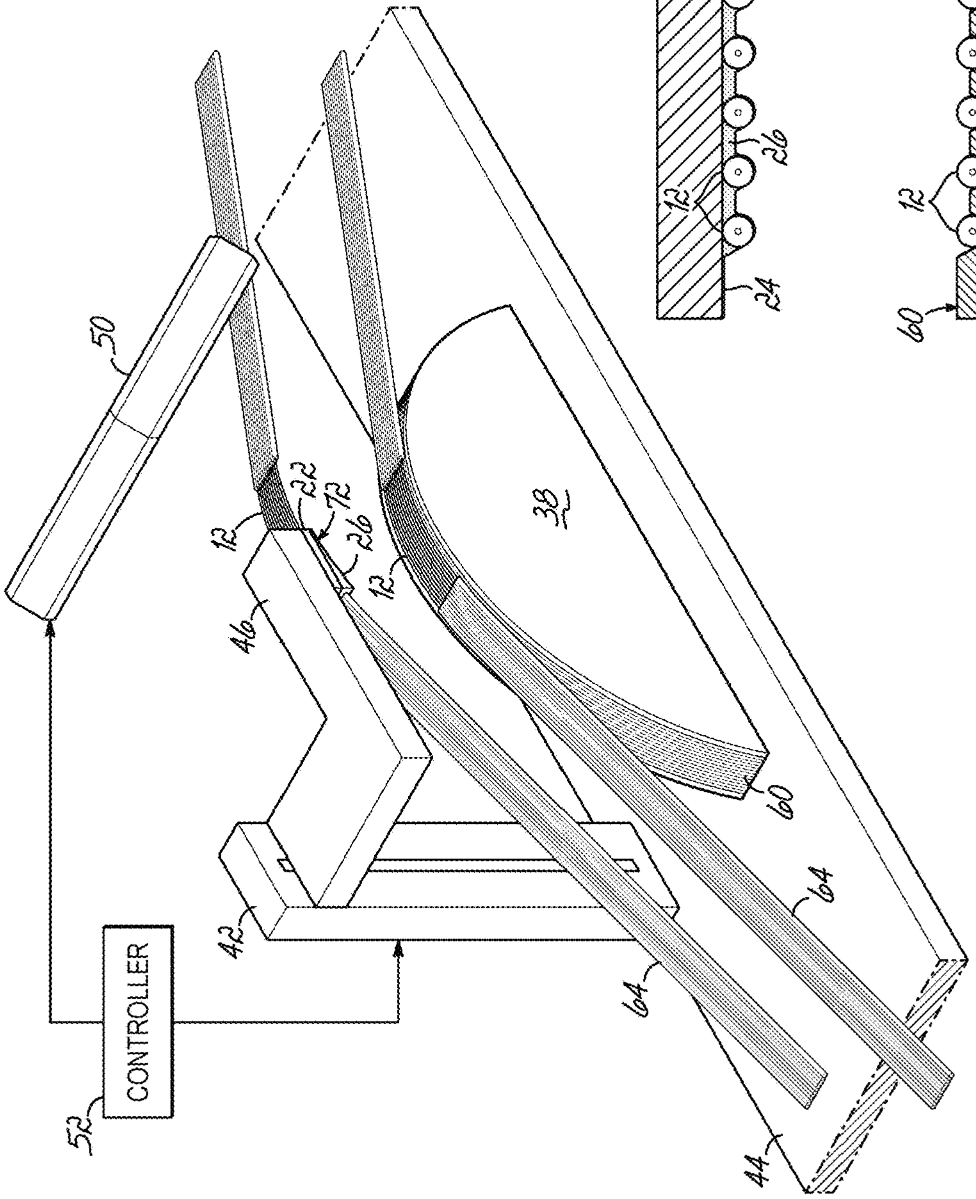
FIG. 15 is a schematic view of the apparatus of FIG. 13 depicting another plurality of optical fibers being seated in the grooves of the grooved arcuate surface.
Figure 16:
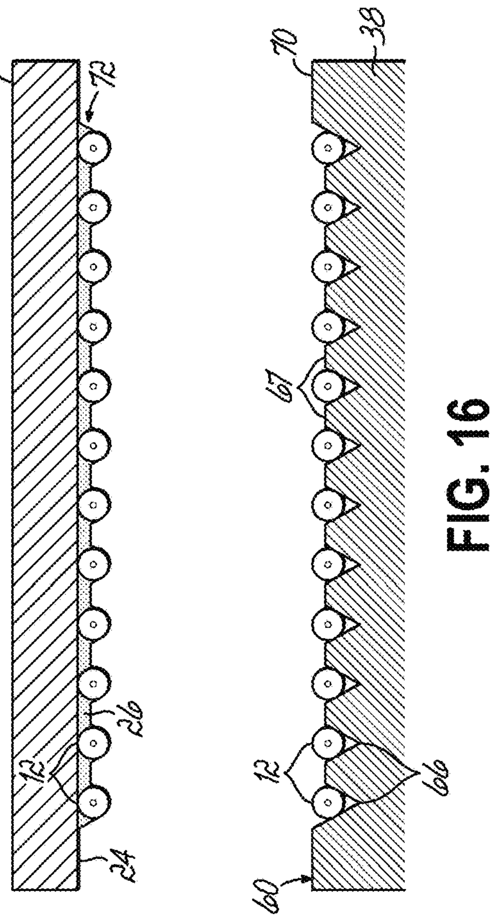
FIG. 16 is a cross-sectional view of the grooved arcuate surface and seated optical fibers of FIG. 15.
Figure 17:
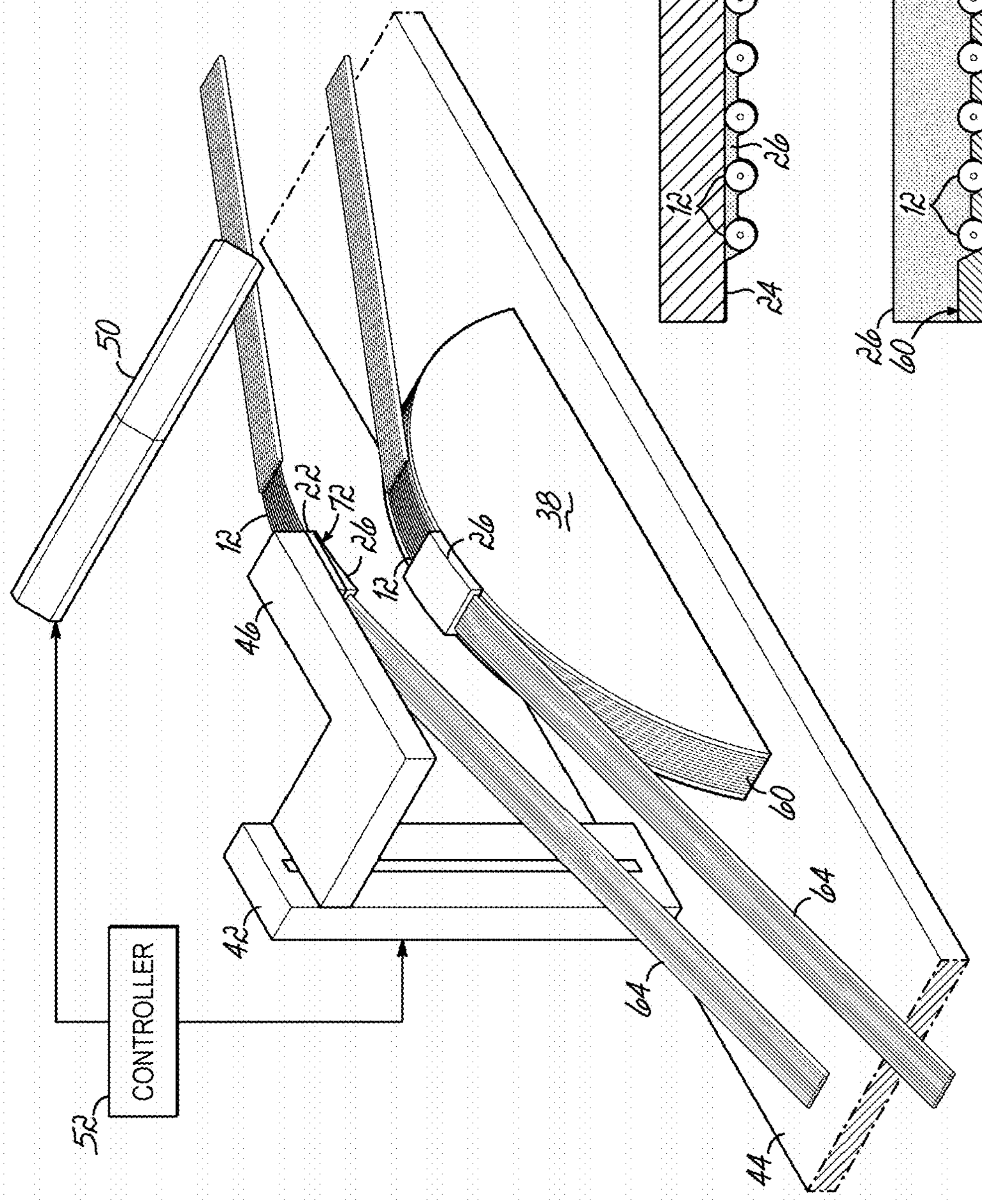
FIG. 17 is a schematic view of the apparatus of FIG. 15 depicting another amount of uncured matrix disposed on the optical fibers seated in the grooves.
Figure 18:
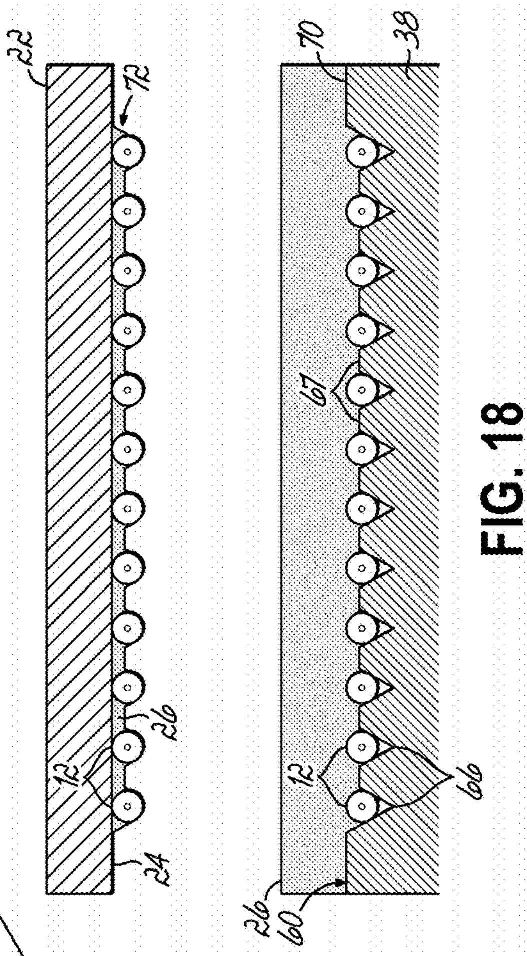
FIG. 18 is a cross-sectional view of the grooved arcuate surface, seated optical fibers, and uncured matrix of FIG. 17.

As depicted by FIGS. 15 and 16, in response to the matrix 26 being cured and separated from the arcuate surface 60 of groove master 38, and in preparation to add an additional row of optical fibers 12 to the block 72 of bonded optical fibers 12, another plurality of optical fibers 12 (e.g., a stripped portion of another fiber optic ribbon cable 64) may be seated on the arcuate surface 60 as described above. As shown by FIGS. 17 and 18, another predetermined amount of uncured matrix 26 may be applied to the optical fibers 12 seated in the grooves 66 of arcuate surface 60. To ensure a sufficient amount of uncured matrix 26 is provided to form the next row of the two-dimensional array 34, the thickness of the layer may be slightly greater than the specified y-pitch $d_2$ of two-dimensional array 34.

Figure 19:
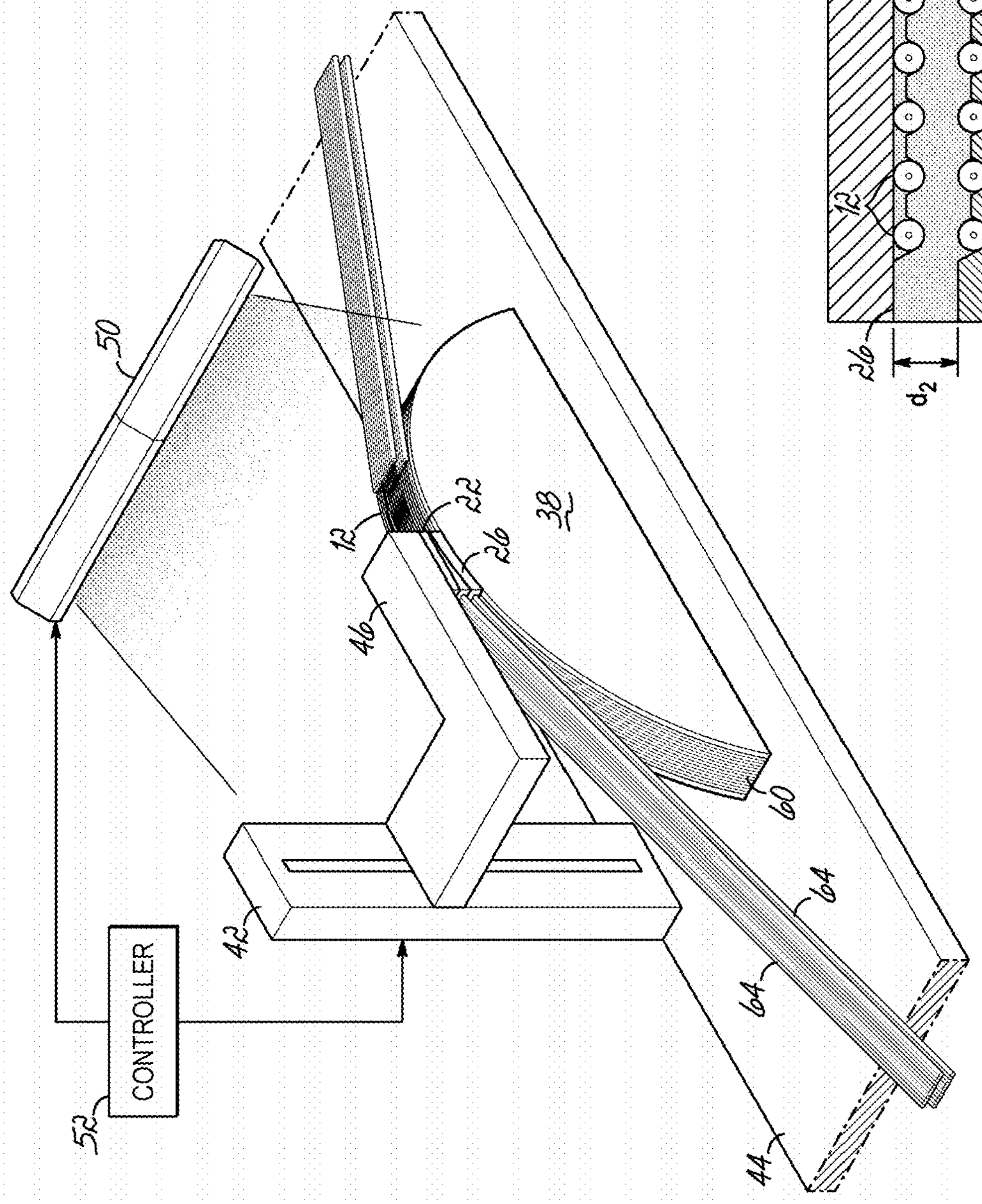
FIG. 19 is a schematic view of the apparatus of FIG. 17 depicting the holder in another bonding position that places the substrate in contact with the matrix.
Figure 20:
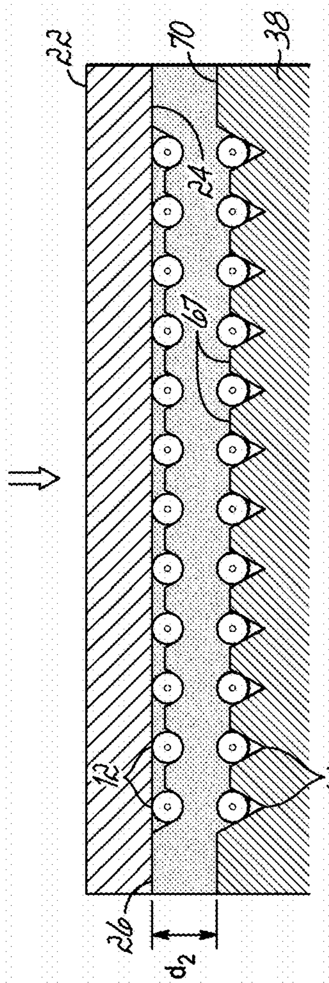
FIG. 20 is a cross-sectional view of the grooved arcuate surface, seated optical fibers, cured matrix, and substrate of FIG. 19.

Referring now to FIGS. 19 and 20, the linear stage 42 may move to the y-position $y_1=y_0+d_2$, thereby positioning the substrate 22 at a distance $d_2$ from the previous bonding height. The substrate 22 and block 72 of bonded optical fibers 12 may thereby be moved into a position defined by the movement of the linear stage 42 and into contact the uncured matrix 26. The matrix 26 may then be cured, e.g., by activating the curing light 50.

Figure 21:
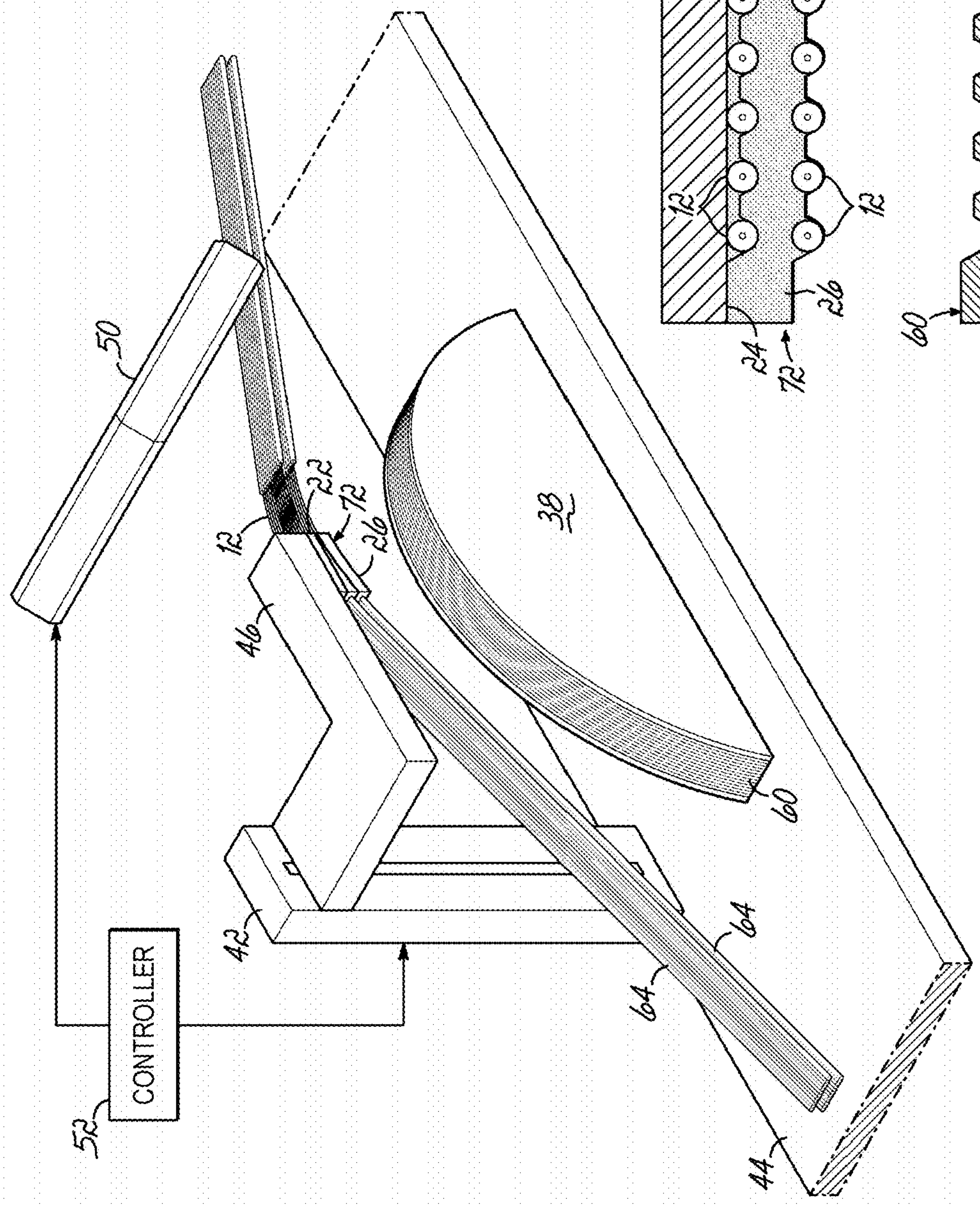
FIG. 21 is a schematic view of the apparatus of FIG. 19 depicting the holder in a separation position that releases the substrate and bonded optical fibers from the grooved arcuate surface.
Figure 22:
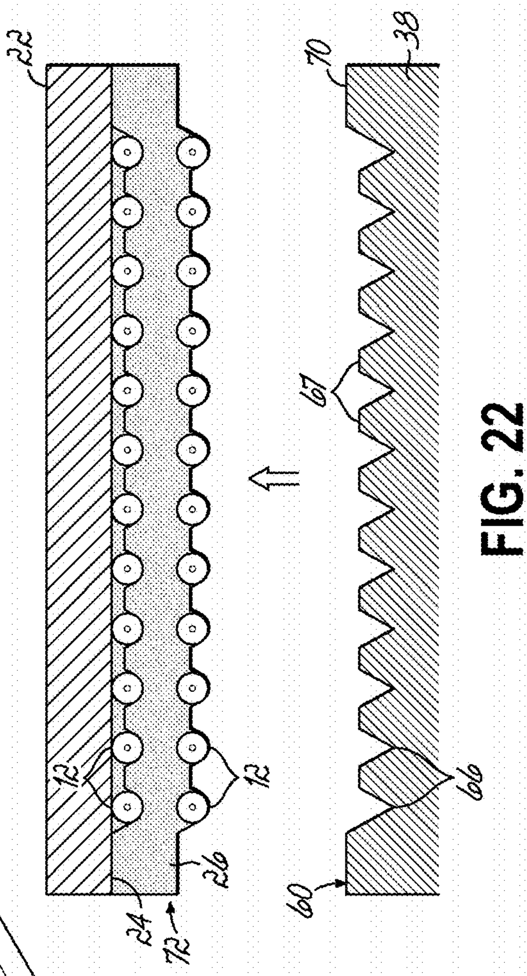
FIG. 22 is a cross-sectional view of the bonded optical fibers and substrate released from the grooved arcuate surface of FIG. 21.

As shown by FIGS. 21 and 22, in response to the matrix 26 being cured by the curing light 50, the controller 52 may cause the linear stage 42 to move the holder 46 to the predetermined separation distance. The newly cured matrix 26 may form a stronger bond to the previously cured matrix 26 than to the non-stick arcuate surface 60. Thus, as the linear stage 42 moves the substrate 22 away from the arcuate surface 60 of groove master 38, the optical fibers 12 and cured matrix 26 may be released from the arcuate surface 60. The released optical fibers 12 and cured matrix 26 may provide an additional row of the two-dimensional array 34. The above described process may be repeated as needed to fabricate a two-dimensional array 34 of optical fibers 12 having a specified number of rows. The substrate 22 may then be removed from the holder 46, e.g., by dissolving the bonding agent with a suitable solvent, weakening the bonding agent by heating the substrate 22 and/or holder 46, or using any other suitable de-bonding process.

Figure 23:
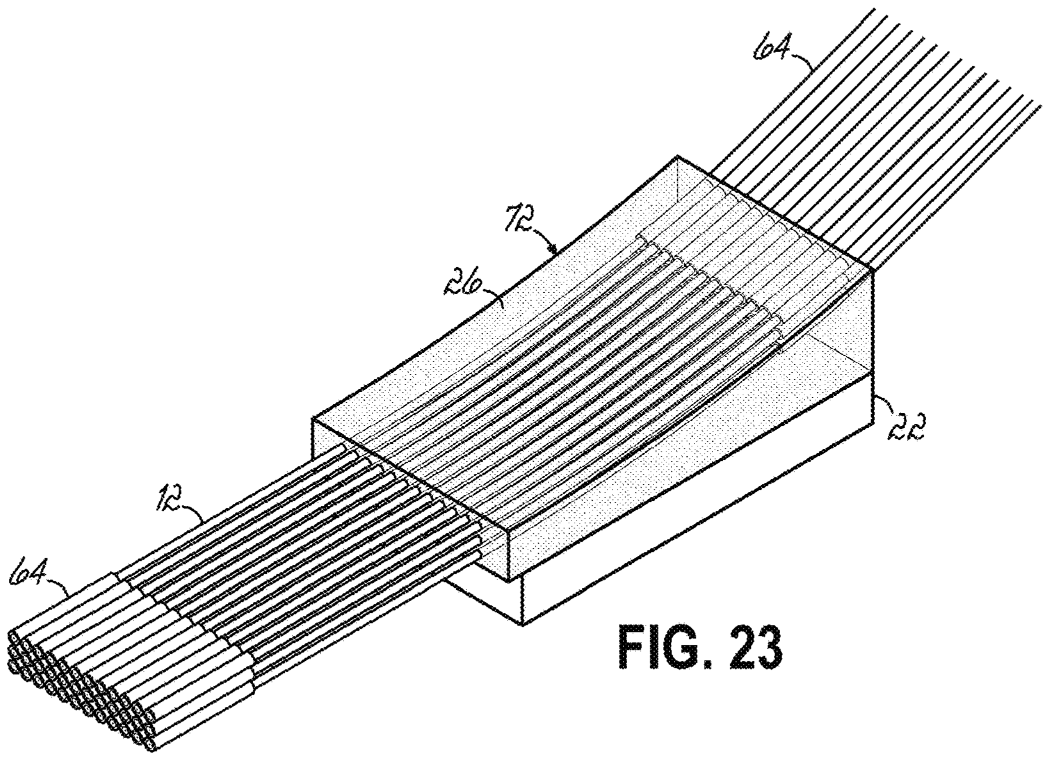
FIG. 23 is a perspective view of the exemplary fiber array unit partially fabricated in FIGS. 7-22 prior to dicing.

FIG. 23 depicts an exemplary block 72 of bonded optical fibers 12 that has been detached from the holder 46. The depicted block 72 includes three rows of twelve optical fibers 12 arranged in a 3×12 array embedded in the matrix 26 and coupled to the substrate 22. In an alternative embodiment, the substrate 22 may be removed, leaving only the matrix 26. It should also be understood that the apparatus 36 and process described above may be adapted to fabricate fiber array units 20 having other numbers and arrangements of fiber end faces 32. The block 72 of bonded optical fibers 12 may be cleaved or diced at a point where the optical fibers 12 have a desired orientation, such as where the optical fibers 12 are tangential to the fiber-side surface 24 of substrate 22. The dicing may be performed in a known manner to provide the specified unit end face angle θ so that the finished fiber array unit 20 resembles the fiber array unit 20 depicted in FIGS. 3-5.

Figure 24:
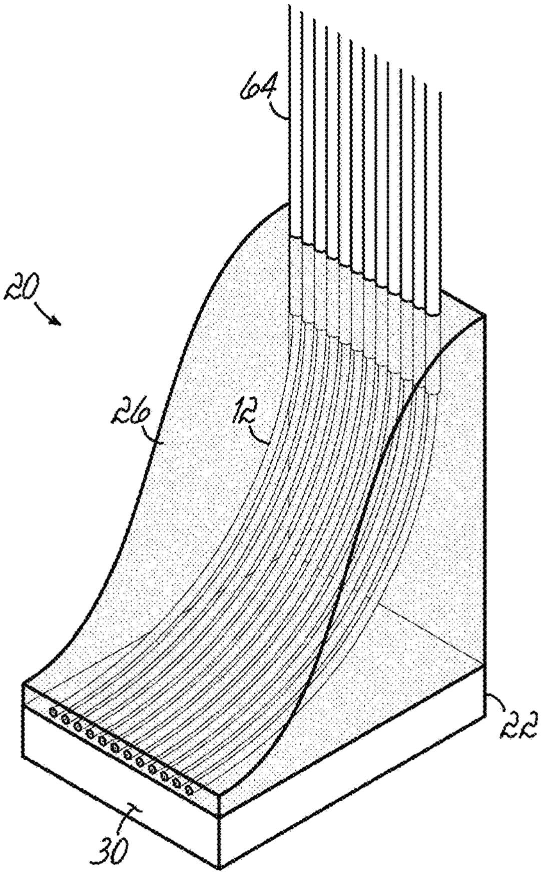
FIG. 24 is a perspective view of an exemplary fiber array unit having a right angle bend.

FIG. 24 depicts an alternative embodiment of the fiber array unit 20 in which a plurality of optical fibers 12 are bonded with a relatively small bend radius. The depicted bend radius may facilitate orienting the unit end face 30 of fiber array unit 20 at a desired angle (e.g., a right angle) relative to the fiber optic ribbon cable 64 as it enters the fiber array unit 20. Fiber array units 20 including an angular displacement of the optical fibers 12 may facilitate operative coupling between the fiber array unit 20 and integrated photonic circuit. For example, a 90-degree bend may facilitate coupling to vertically oriented waveguide devices, such as grating couplers. Fiber array units 20 may be fabricated with any desired angular displacement by configuring the groove master 38 to have a suitable radius of curvature and the bonding process to encapsulate a suitable length of the optical fibers 12. By way of example, the groove master 38 could be configured with a 2.5 mm mandrel and the bonding process configured to encapsulate a 4.0 mm length of the optical fibers 12 having this bend radius. Following the described process above, a 90 degree fiber array unit 20 can be fabricated using a flat substrate 22.

It is anticipated that the diameters of optical fibers 12 may continue to decrease in order to increase cable density. Advantageously, fiber array units 20 fabricated using the above described process with optical fibers 12 having smaller diameters may provide a corresponding increase in interconnect density. In addition, reducing the lateral distances (e.g., x and y-distances) between optical fibers 12 may produce a corresponding reduction in the amount of matrix 26 between the optical fibers 12. These thinner matrix spans may improve the stability and precision of the fiber array unit 20 as compared to fiber array units 20 having larger spans.

Figure 25:
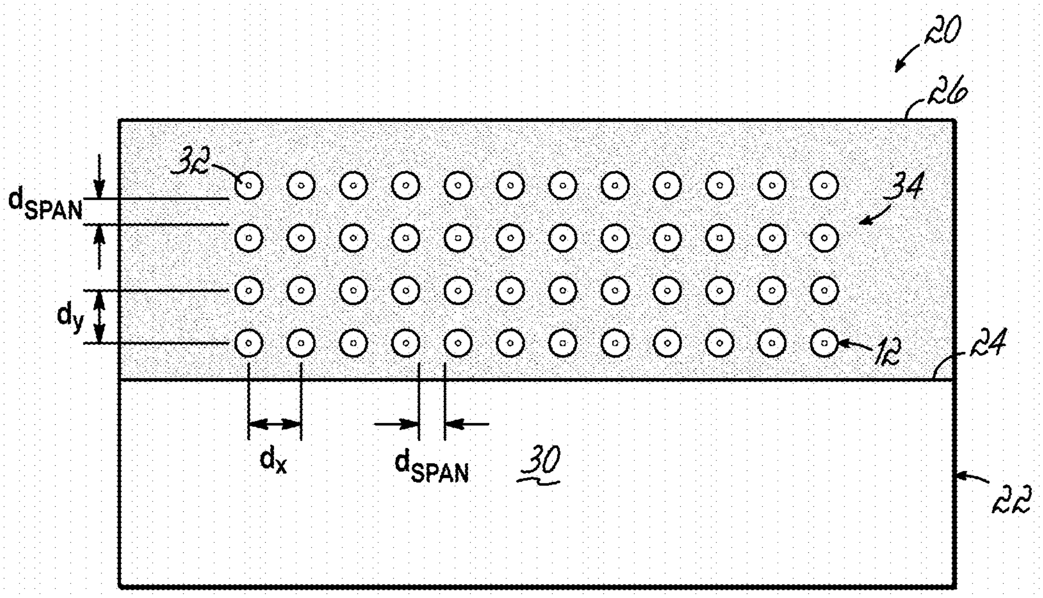
FIGS. 25 and 26 are end views of exemplary fiber array units having different pitch dimensions.
Figure 26:
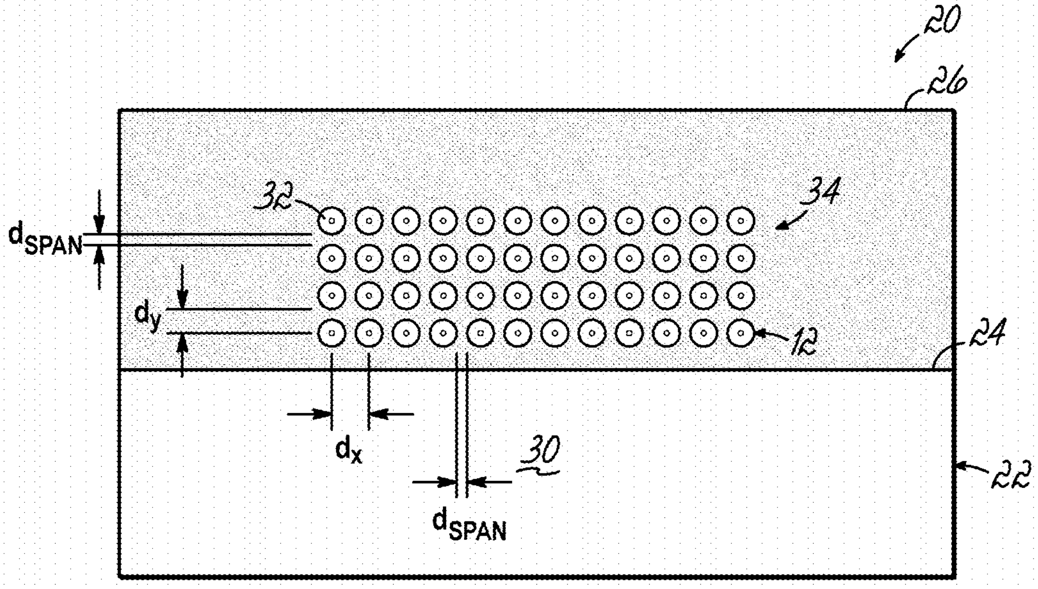

FIGS. 25 and 26 illustrate exemplary unit end faces 30 including a plurality of optical fibers 12 (e.g., 48 optical fibers 12 arranged in a 4×12 array) having a cladding 18 with the same diameter (e.g., 125 μm) but which are surrounded by protective layers (not shown) having different diameters (e.g., 190 μm (FIG. 25) and 145 μm (FIG. 26). Each two-dimensional array 34 has x-direction fiber spacing distances dx (or x-pitch) defined by the configuration of grooves 66 of groove master 38, and y-direction fiber spacing distances $d_y$ (or y-pitch) defined by operation of the linear stage 42. The x and y-direction span distances $d_{SPAN}$ may be defined by the x and y-direction spacing distances and the diameter of the optical fiber cladding 18 and/or the protective coating 14. In any case, it should be understood that the y-pitch may be the same as or different from the x-pitch. The spans between the optical fibers 12 are not limited to any particular size, but may be 10 μm or less, for example, to maximize optical fiber density.

As can be seen from FIGS. 25 and 26, the fiber end faces 32 of optical fibers 12 encased with the smaller diameter protective layers may be arranged in closer proximity than those with larger diameter protective layers. Optical fibers 12 may also be designed to have a reduced cladding diameter, e.g., 85 μm. Optical fibers 12 having a reduced cladding diameter may enable the diameter of the protective coating 14 to be further reduced, e.g., to 125 μm. Optical fibers 12 may also be encased in a precision thickness thin layer protective coating 14, in which case the protective coating 14 may be left on the optical fibers 12 prior to seating them in the grooves 66 of arcuate surface 60. Thus, optical fibers 12 encased in a protective coating 14 may be formed into a precision array without first stripping the protective coating 14.

Figure 27:
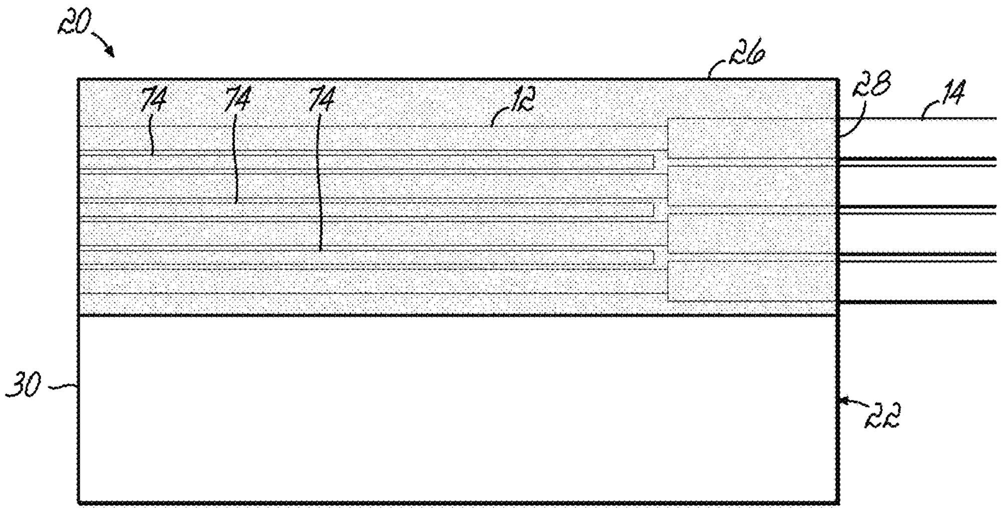
FIGS. 27 and 28 are perspective views of an exemplary fiber array unit including spacers configured to improve thermal stability in the y-direction.
Figure 28:
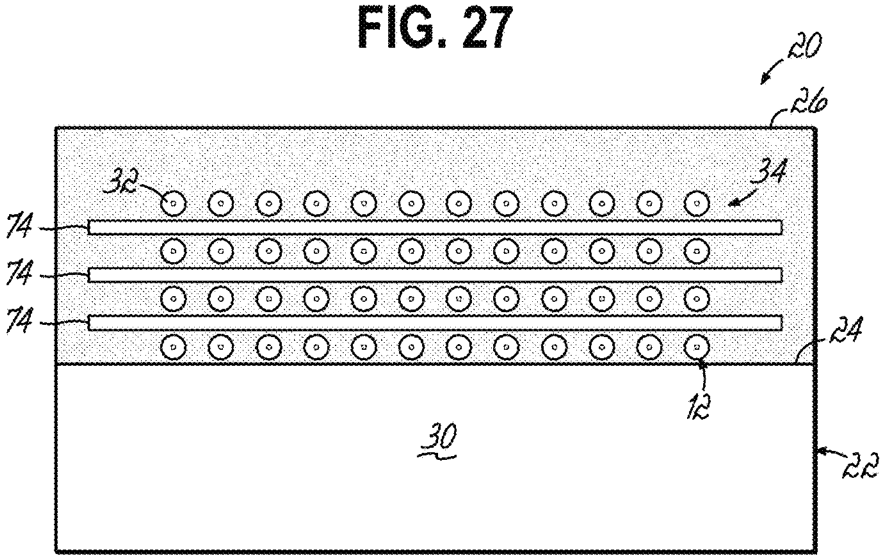
Figure 29:
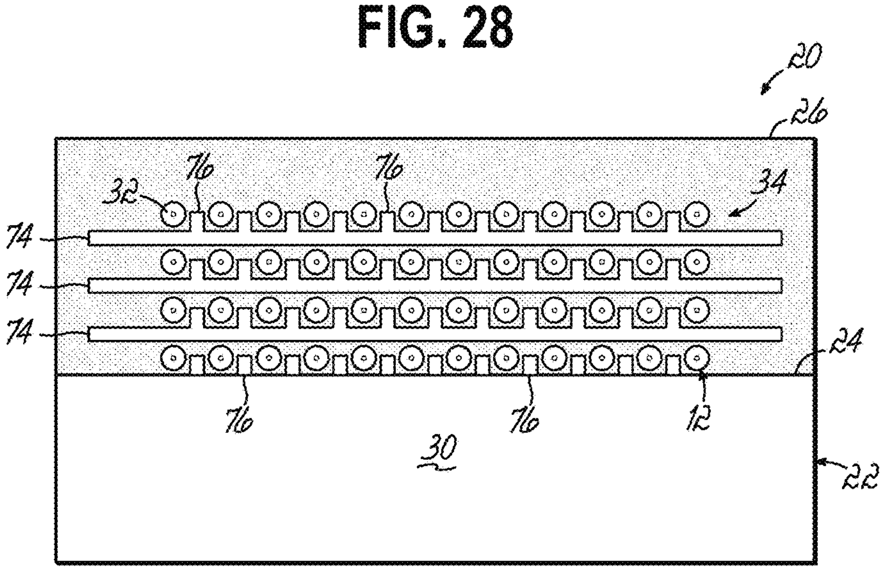
FIG. 29 is an end view of an exemplary fiber array unit including spacers having projections configured to improve thermal stability in the x-direction and y-direction.

FIGS. 27-29 depict a fiber array unit 20 that includes a spacer 74 (e.g., a glass sheet) between each row of optical fibers 12. Spacers 74 may be used for applications that require a relatively wide spans between fiber end faces 32, e.g., $d_{SPAN}$>100 μm. The spacer 74 may fill a portion of the space between rows of optical fibers 12, e.g., more than 50% of the space. Sub-100 μm thick flat glass is readily available at low cost as a high volume component for foldable displays, and could be used for the spacers 74. Spacers 74 may reduce the thermal expansion of the two-dimensional array 34 by reducing the percentage of the block 72 of optical fibers 12 that is comprised of a matrix binder material, e.g., adhesive. The groove master 38 may also be made flat, with the optical fibers 12 seated in the grooves 66 by pressure from a spacer 74 during curing. Uncured matrix 26 may then be placed on the spacer 74 to fabricate the next row of optical fibers 12.

FIG. 29 depicts an alternative embodiment in which the substrate 22 and spacers 74 include projections 76 configured to improve thermal stability in the x-direction. These projections 76 may be configured to avoid contact with the optical fibers 12 so that the path of each optical fiber 12 through the matrix 26 is defined solely by the position of the linear stage 42 and the configuration of the grooves 66 of groove master 38. The projections 76 may be introduced in the substrate 22 and/or spacers 74, for example, by printing solgel or glass particles on the substrate 22 and/or spacers 74 with a binder (e.g., a polymer binder) and then sintering the substrate 22 and/or spacer.

Figure 30:
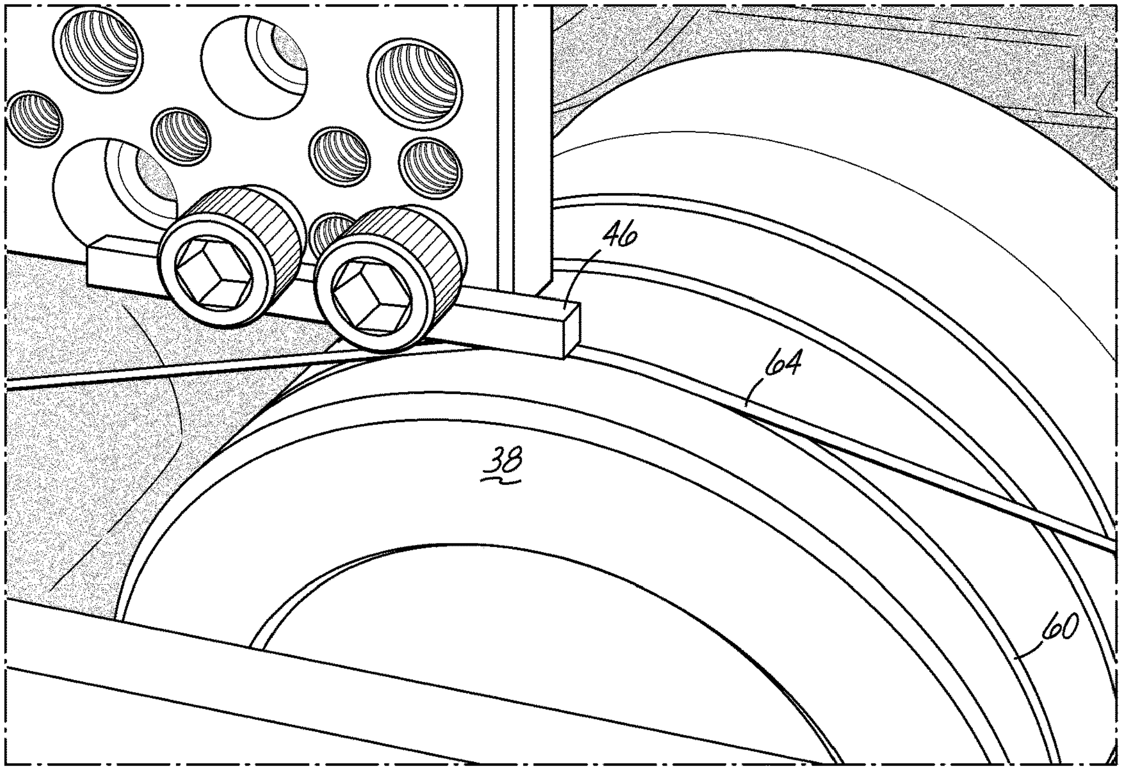
FIG. 30 is a perspective view of an exemplary prototype apparatus for fabricating fiber array units.
Figure 31:
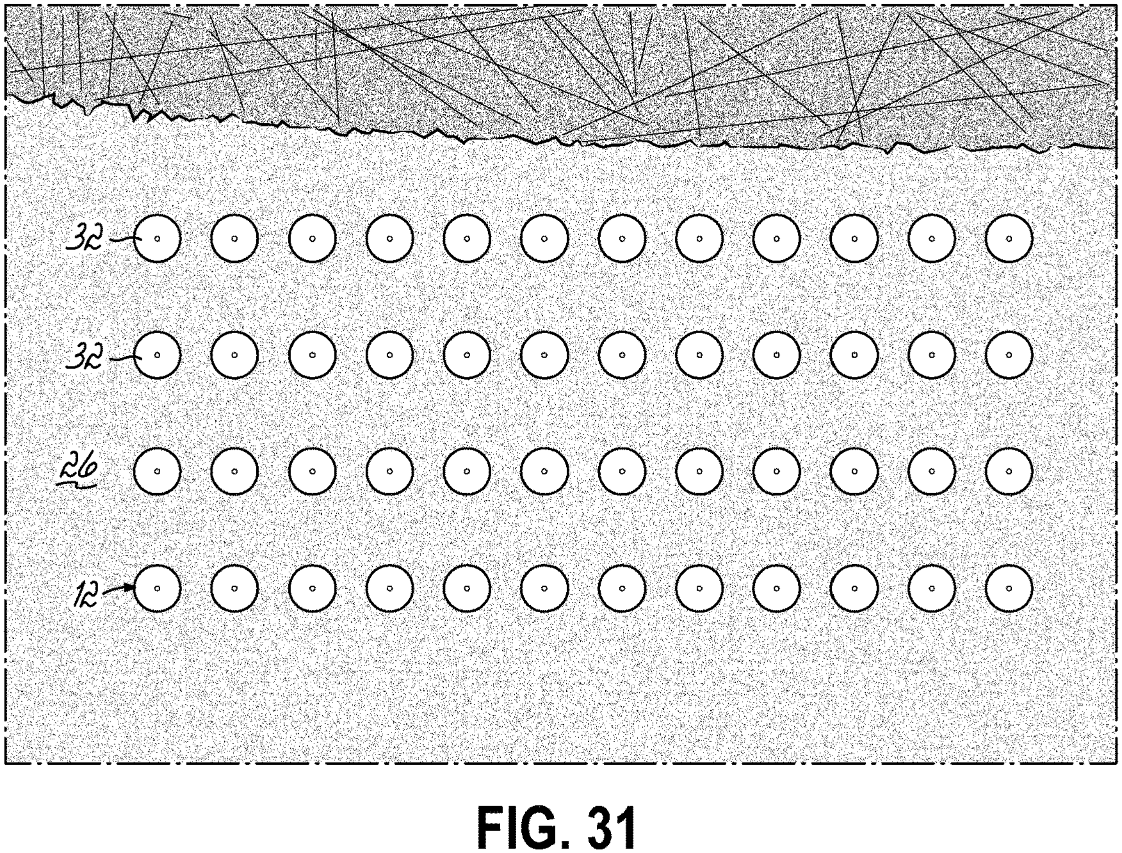
FIG. 31 is an end view of an exemplary prototype fiber array unit fabricated using the apparatus of FIG. 30.

FIG. 30 depicts a prototype apparatus 36 that demonstrates the feasibility of fabricating fiber array units 20 as disclosed above. The grooves 66 have a pitch of 200 μm, which matched the pitch of the fiber optic ribbon cable 64 used to generate experimental fiber array units 20. The grooves 66 were machined by diamond turning a 75 mm diameter Delrin® cylinder. A brass rod was used to provide the holder 46. FIG. 31 depicts the diced and polished unit end face 30 of a fiber array unit 20 having a 4×12 two-dimensional array 34 that was fabricated using the prototype apparatus 36 illustrated by FIG. 30. To demonstrate the flexibility of the disclosed fiber array unit technology, the vertical pitch was programmed to be 300 μm. The resulting fiber array unit 20 has excellent fiber core pitch uniformity, and demonstrates the feasibility of both the disclosed methods and apparatuses.

Advantages of the disclosed fiber array units 20 include lower component cost and a simpler assembly process which is more easily automated as compared to conventional v-groove substrate based fiber array units. While conventual fiber array units using v-groove substrates are limited to only one layer of fibers, the fiber array units 20 disclosed herein are scalable to two or more layers. To compensate for shrinkage of the matrix 26, the pitch of the groove master 38 and the positions of the linear stage 42 can be pre-adjusted to obtain the designed fiber pitch in the final device.

It should be understood that the spacings and patterns of fiber end faces 32 in the arrays 34 depicted herein are exemplary only. Accordingly, the described process can be used to fabricate fiber array units 20 having nearly any arrangement of fiber end faces 32. Because the precision transferred fiber array is built in a layer-by-layer process, the two-dimensional array 34 can be fabricated with a wide range of patterns, such as hexagonal or other patterns, for example. In addition, groove masters 38 having different x-pitches could be used for different rows of optical fibers 12 (e.g., by axially shifting the machined cylinder between different arcuate surfaces 60) to further expand the possible two-dimensional array patterns.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A method of fabricating a fiber array unit, comprising:

seating each of a plurality of first optical fibers in a respective groove of an arcuate surface having a plurality of grooves;

applying a first amount of uncured matrix sufficient to cover at least a portion of each of the plurality of first optical fibers seated in the grooves of the arcuate surface;

moving a substrate having a fiber-side surface to a first bonding distance from the arcuate surface that brings the fiber-side surface into contact with the first amount of uncured matrix;

curing the first amount of uncured matrix so that the first optical fibers are bonded to the substrate by a first amount of cured matrix;

moving the substrate to a separation distance from the arcuate surface so that the plurality of first optical fibers bonded to the substrate are released from the arcuate surface, and forming a unit end face of the fiber array unit, wherein the unit end face includes respective end faces of the first optical fibers surrounded by the cured matrix. and wherein each first optical fiber of the plurality of first optical fibers has an orientation at an entry point into the cured matrix and follows a curved path between the entry point and the unit end face.

2. The method of claim 1, further comprising:

seating each of a plurality of second optical fibers in the respective groove of the arcuate surface having the plurality of grooves;

applying a second amount of uncured matrix sufficient to cover at least a portion of each of the plurality of second optical fibers seated in the grooves of the arcuate surface;

moving the substrate to a second bonding distance from the arcuate surface that brings the plurality of first optical fibers into contact with the second amount of uncured matrix; and curing the second amount of uncured matrix so that the plurality of second optical fibers are bonded to the substrate by the first amount of cured matrix and a second amount of cured matrix.

3. The method of claim 2, wherein:

the second bonding distance places the fiber-side surface of the substrate farther from the arcuate surface than the first bonding distance by a first predetermined distance corresponding to a vertical pitch of the fiber array unit, and the plurality of grooves are spaced by a second predetermined distance corresponding to a horizontal pitch of the fiber array unit.

4. The method of claim 1, wherein curing the first amount of uncured matrix comprises exposing the first amount of uncured matrix to ultraviolet light.

5. The method of claim 1, wherein seating each of the plurality of first optical fibers in the respective groove of the arcuate surface includes applying tension to the plurality of first optical fibers.

6. The method of claim 1, further comprising:

determining the substrate has reached the first bonding distance from the arcuate surface based on an increase in an amount of resistance to the movement of the substrate.

7. The method of claim 1, wherein forming the unit end face further comprises cleaving or dicing the plurality of first optical fibers when the plurality of first optical fibers is embedded in the cured matrix.

8. The method of claim 7, wherein forming the unit end face further comprises polishing the unit end face.

9. The method of claim 1, wherein the curved path is configured so that the unit end face is angled relative to the orientation.

10. The method of claim 1, wherein the first optical fibers are embedded in the cured matrix, the method further comprising:

removing the substrate from the cured matrix.

11. A method of fabricating a fiber array unit, comprising:

(a) seating each of a plurality of first optical fibers in a respective groove of an arcuate surface having a plurality of grooves;

(b) applying a first amount of uncured matrix sufficient to cover at least a portion of each of the plurality of first optical fibers seated in the grooves of the arcuate surface;

(c) moving a substrate having a fiber-side surface to a first bonding distance from the arcuate surface that brings the fiber-side surface into contact with the first amount of uncured matrix;

(d) curing the first amount of uncured matrix so that the first optical fibers are bonded to the substrate by a first amount of cured matrix;

(e) moving the substrate to a separation distance from the arcuate surface so that the plurality of first optical fibers bonded to the substrate are released from the arcuate surface; and (f) repeating steps (a)-(e) for at least a plurality of second optical fibers; and (g) forming a unit end face of the fiber array unit, wherein the unit end face includes a respective fiber end face for each optical fiber in the plurality of first optical fibers and the at least a plurality of second optical fibers, and wherein the fiber end faces are arranged in a two-dimensional array and surrounded by the cured matrix.

12. The method of claim 11, wherein step (f) further comprises repeating steps (a)-(e) for a plurality of third optical fibers.

13. The method of claim 11, wherein:

the fiber end faces each have an end face diameter, and the two-dimensional array of the fiber end faces has an x-pitch of between 1.10 times the end face diameter and 10 times the end face diameter, and a y-pitch of between 1.10 times the end face diameter and 10 times the end face diameter.

14. The method of claim 11, wherein the plurality of first optical fibers and the at least a plurality of second optical fibers are embedded in the cured matrix, the method further comprising:

removing the substrate from the cured matrix.

15. The method of claim 11, wherein each optical fiber of the plurality of first optical fibers and the at least a plurality of second optical fibers has an orientation at an entry point into the cured matrix and follows a curved path between the entry point and the unit end face, and wherein the curved path is configured so that the unit end face is angled relative to the orientation.

* * * * *